(12) United States Patent
Kato et al.

(10) Patent No.: US 7,379,635 B2
(45) Date of Patent: May 27, 2008

(54) OPTICAL SWITCH WITH THREE OPTICAL PORTS ON ONE SIDE

(75) Inventors: Yoshichika Kato, Tachikawa (JP); Keiichi Mori, Tokyo (JP); Kenji Kondou, Chofu (JP); Osamu Imaki, Hachioji (JP); Yoshihiko Hamada, Akiruno (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 11/580,599

(22) Filed: Oct. 13, 2006

(65) Prior Publication Data

US 2007/0086698 A1    Apr. 19, 2007

(30) Foreign Application Priority Data

Oct. 17, 2005    (JP)    ............................. 2005-302344

(51) Int. Cl.
*G02B 6/26* (2006.01)
(52) U.S. Cl. .......................................... 385/18; 385/22
(58) Field of Classification Search ............ 385/16–18, 385/22, 44, 45
See application file for complete search history.

(56) References Cited

U.S. PATENT DOCUMENTS

| | | | |
|---|---|---|---|
| 6,993,218 B2 * | 1/2006 | Kanie et al. .................. | 385/18 |
| 2004/0131306 A1 * | 7/2004 | Dejima et al. ................ | 385/18 |

FOREIGN PATENT DOCUMENTS

| | | |
|---|---|---|
| JP | 2000-111815 | 4/2000 |
| JP | 2001-201699 | 7/2001 |
| JP | 2003-043270 | 2/2003 |
| JP | 2004-125899 | 4/2004 |
| JP | 2005-037885 | 2/2005 |

OTHER PUBLICATIONS

The First Office Action from the Chinese Patent Office issued on Oct. 12, 2007 for Corresponding Chinese Patent Application No. 200610164705.2 citing US2004/0131306 (previously cited by U.S. Examiner in First Office Action on Jul. 25, 2007).

* cited by examiner

*Primary Examiner*—Frank G. Font
*Assistant Examiner*—Charlie Y Peng
(74) *Attorney, Agent, or Firm*—David N. Lathrop, Esq.; Gallagher & Lathrop

(57) ABSTRACT

The end parts of three optical waveguide parts are supported, mutually in parallel, on a substrate, the end part of the center optical waveguide part being one input port and the end parts of other two optical waveguide parts being a first and a second output port, the emitted light from the input port is switched, by means of a first moving mirror and a second moving mirror which are switchingly inserted into positions having the same distance from the end face of the input port, to either the first output port side or the second output port side, the light from the first moving mirror and the light from the second moving mirror being reflected respectively in a first fixed mirror or a second fixed mirror, the light being respectively coupled to the first or the second output port.

20 Claims, 9 Drawing Sheets

OPTICAL SWITCH WITH THREE OPTICAL PORTS ON ONE SIDE

BACKGROUND OF THE INVENTION

1. Field of the Invention

This invention pertains to an optical switch used in the switching of optical transmission lines.

2. Description of the Related Art

In Patent Reference 1 and Patent Reference 2, there are reported optical switches using MEMS (Micro Electro Mechanical Systems) techniques of a type with two inputs and two outputs and a type with one input and three outputs.

In case the input light is switched to two outputs, it is possible to provide these optical switches for that use, but it is appropriate to prepare a device composed of one input port and two output ports for the purpose of miniature integration. In that case, it is further in particular optimal, for the purpose of intensive use of space, to choose a device having a structure in which the three ports are all lined up on one side of a chip.

In FIG. 2B of Patent Reference 3, there is described an example of a MEMS optical switch having such a structure. However, this configuration has the optical path lengths which are not the same going from the switch-related input port respectively to the two output ports, so the conditions of the two optical paths are unbalanced and output light of the same optical quality cannot be obtained from the two output ports.

Generally, in an optical switch, it is desirable for the intensity, spot size, polarization properties and the like of the switched output lights to be all uniform among the output port. To that end, it is a condition that the optical propagation conditions of the switched optical paths are equivalent. Accordingly, in the case of an optical switch with one input and two outputs, if two switchable optical paths are configured to be completely symmetric, including the disposition and the angle, optical distance, and collimator parts, etc., the aforementioned conditions are completely satisfied in an ideal way. Also, even if two optical paths cannot be configured to be completely symmetric, by at least making the optical distances thereof coincide and the mirror angle relationships equivalent, it is possible to equalized the two output lights regarding the intensity and spot size, as well as the polarization properties.

Further, in FIG. 3 of Patent Reference 3, there was described an example of an optical switch with a structure in which the three ports are all lined up on one side and yet, the optical paths of both output ports are uniform, but this is a switch utilizing a rotating mirror, and it is not possible to obtain a bistable operation etc. in the moving parts.

Also, according to a conventional device, described in Patent References 1 to 3, with a structure inserting and pulling out a moving mirror into/from the optical path, and switching and utilizing the reflection and transmission thereof, the moving mirror must first, in the case of utilizing reflected light by inserting a moving mirror in the optical path, be completely inserted in the optical path with a sufficient actuation distance, and the residual transmitted light, i.e. the crosstalk to the transmission port, must be sufficiently blocked and brought to extinction. Moreover, in the case of pulling out the moving mirror and utilizing the transmitted light, the moving mirror must be completely pulled out, by the sufficient actuation distance only, from the optical path, and the crosstalk of the residual reflected light arising from the fact that one part of the mirror slightly blocks the optical path must be sufficiently brought to extinction. In the conventional device, it was in the end imperative, in order to satisfy the isolation specification, to take each sufficient actuation distance, the former and the latter, to be the stroke and to actuate each moving mirror.

Patent Reference 1: Japanese Patent Application Laid Open No. 2005-37885.

Patent Reference 2: Japanese Patent Application Laid Open No. 2000-111815.

Patent Reference 3: Japanese Patent Application Laid Open No. 2001-201699.

Patent Reference 4: Japanese Patent Application Laid Open No. 2003-43270.

Patent Reference 5: Japanese Patent Application Laid Open No. 2004-125899.

SUMMARY OF THE INVENTION

It is a first object of the present invention, taking into consideration the aforementioned circumstances, to implement, by using a translationally actuated mirror, a MEMS optical switch having a structure in which three ports are all lined up on one side and two switchable optical paths are constituted as uniformly as possible.

In this way, there can be obtained a novel optical switch for which conventionally not available miniature intensive integration is possible and for which the optical properties of the output lights related to switching are sufficiently or completely uniform. In the present invention, regarding moving mirrors, technologies such as bistable operation related to the actuator cited in Patent Reference 1 and stable center-of-gravity disposition can be utilized.

Also, the present invention has for a second object to propose a structure of an optical switch having a structure in which the input and output ports are all lined up on one side and the optical properties of the output light are taken to be uniform and in which the actuation strokes of the moving mirrors needed for the optical switch are shortened.

It is another object of the present invention to propose, in the aforementioned optical switch, an optical switch with a structure in which it is difficult for a misalignment of the optical axcs between the input port and the output ports to occur even if manufacturing errors arise.

The optical switch proposed as a first aspect of the present invention comprises, a support part supporting the end parts, mutually lined up in parallel on a substrate, of three optical waveguide parts;

a first and a second moving mirror capable of varying the relative positions with respect to said substrate; and a first and a second fixed mirror having fixed relative positions with respect to said substrate; wherein the end part of the center optical waveguide part of the three optical waveguide parts supported by said support part is one input port of the concerned optical switch;

the end parts of the two other optical waveguide parts, adjacent on both sides of said center optical waveguide part, are the first and second output ports of the concerned optical switch;

said first moving mirror and said second moving mirror are respectively capable of insertion into insertion positions, said insertion positions are on the optical path of emitted light from said input port, and the distances on the optical axis from said input port to each said insertion positions are the same;

it is capable of switching between a state in which only said first moving mirror is inserted into said insertion position and a state in which only said second moving mirror is inserted into said insertion position;

the emitted light from said input port is reflected, by first moving mirror or said second moving mirror which are inserted into said insertion position, respectively to the side of said first output port or to the side of said second output port;

the light reflected by first moving mirror to the side of said first output port is further reflected by said first fixed mirror and coupled to said first output port in parallel with, and in a reverse direction from, the emitted light from said input port;

the light reflected by said second moving mirror to the side of said second output port is further reflected by said second fixed mirror and coupled to said second output port in parallel with, and in a reverse direction from, the emitted light from said input port; and the optical path from said first moving mirror to said first output port via said first fixed mirror and the optical path from said second moving mirror to said second output port via said second fixed mirror are symmetric with respect to the axis of the emitted light of said input port.

An optical switch proposed as a second aspect of the present invention comprises a support part supporting the end parts, mutually lined up in parallel on a substrate, of three optical waveguide parts;

a first and a second moving mirror capable of varying the relative positions with respect to said substrate; and a first and a second fixed mirror having fixed relative positions with respect to said substrate; wherein the end part of the center optical waveguide part of the three optical waveguide parts supported by said support part is one input port of the concerned optical switch;

the end parts of the two other optical waveguide parts, adjacent on both sides of said center optical waveguide part, are the first and second output ports of the concerned optical switch;

said first moving mirror and said second moving mirror are respectively capable of insertion into insertion positions, said insertion positions are on the optical path of emitted light from said input port, and the distances on the optical axis from said input port to each said insertion positions are the same;

it is capable of switching between a state in which only said first moving mirror is inserted into said insertion position and a state in which only said second moving mirror is inserted into said insertion position;

the emitted light from said input port is reflected, by first moving mirror or said second moving mirror which are inserted into said insertion position, respectively to the side of said first output port or to the side of said second output port;

the light reflected by first moving mirror to the side of said first output port is further reflected by said first fixed mirror and coupled to said first output port in parallel with, and in a reverse direction from, the emitted light from said input port;

the light reflected by said second moving mirror to the side of said second output port is further reflected by said second fixed mirror and coupled to said second output port in parallel with, and in a reverse direction from, the emitted light from said input port; and the end parts of said three optical waveguide parts are end parts of three single-mode optical waveguide parts;

the end part which is said input port and/or the end parts which are said two output ports have concentrating part(s); the light field emission patterns of each end face of said end parts of single-mode optical waveguide parts which are said two output ports are identical;

the optical path from said first moving mirror to said first output port via said first fixed mirror and the optical path from said second moving mirror to said second output port via said second fixed mirror are symmetric with respect to the axis of the emitted light of said input port.

In an optical switch proposed as a third aspect of the present invention, said first moving mirror and second moving mirror are respectively actuated by means of a first electrostatic actuator and a second electrostatic actuator, in a direction in the plane of the substrate, for insertion into and extraction from said insertion position;

the insertion/extraction actuation directions of said first moving mirror and second moving mirror are inclined in respectively rectilinear directions with respect to the optical axis of said input port; and the insertion/extraction actuation direction of said first moving mirror and the insertion/extraction actuation direction of said second moving mirror have a linear symmetry with respect to the optical axis of said input port.

In an optical switch proposed as a fourth aspect of the present invention, a first bistable hinge supporting said first moving mirror and having two stable states which are an inserted state such that said first moving mirror is inserted into said insertion position and an extracted state such that said first moving mirror is extracted from the same position; and a second bistable hinge supporting said second moving mirror and having two stable states which are an inserted state such that said second moving mirror is inserted into said insertion position and an extracted state such that said second moving mirror is extracted from the same position; wherein there is carried out actuation control of switching from a step in which one of said first moving mirror and said second moving mirror is in said inserted state and the other is in said extracted state, via a step in which both are at the same time in said extracted state, to a step in which the one is in said extracted state and the other is in said inserted state; and, in each said extracted state, part of said extracted first/second moving mirror remains within the assumable optical path in which the emitted light coming from said input port propagates in the case not blocked by said second/first moving mirror.

In an optical switch proposed as a fifth aspect of the present invention, a first bistable hinge supporting said first moving mirror and having two stable states which are an inserted state such that said first moving mirror is inserted into said insertion position and an extracted state such that said first moving mirror is extracted from the same position; and a second bistable hinge supporting said second moving mirror and having two stable states which are an inserted state such that said second moving mirror is inserted into said insertion position and an extracted state such that said second moving mirror is extracted from the same position; wherein said first moving mirror and said second moving mirror are disposed leaving a neutral zone, being a spacing just large enough so that the two do not collide when an arbitrary one thereof is in said inserted state and the other is in said extracted state and an actuation to put the one which is in the inserted state into said extracted state and an actuation to put the other which is in the extracted state into said inserted state are simultaneously started and together executed;

and said actuation to put the one which is in the inserted state into said extracted state and said actuation to put the other which is in the extracted state into said inserted state are simultaneously started and together executed.

In an optical switch proposed as a sixth aspect of the present invention, said first moving mirror and second moving mirror are formed as an integral component, a state of said first moving mirror being inserted into said insertion position and a state of said second moving mirror being inserted into said insertion position are switched by means of said integral component being actuated in a direction in the plane of said substrate by one electrostatic actuator.

An optical switch proposed as a seventh aspect of the present invention comprises, a support part supporting the end parts, mutually lined up in parallel on a substrate, of three optical waveguide parts;

a moving mirror capable of varying the relative positions with respect to said substrate;

and a first, a second, and a third fixed mirror having fixed relative positions with respect to said substrate; wherein the end part of any one optical waveguide part of the three optical waveguide parts supported by said support part is one input port of the concerned switch, and the end parts of the two remaining optical waveguide parts are the first and second output ports of the concerned switch;

said first fixed mirror reflecting the light from said input port to the side of said first output port is placed in the optical path of the emitted light from said input port;

said moving mirror is constituted to be capable of being inserted into and extracted from a position on the optical path from said input port to said first fixed mirror, and said moving mirror reflects the light from said input port to the side of said second output port when said moving mirror is inserted into said position on the optical path;

the light reflected by said first fixed mirror is further reflected by said second fixed mirror, and the light reflected by said second fixed mirror is coupled to said first output port in parallel with and in a reverse direction from that of the emitted light from said input port;

the light reflected by said moving mirror is further reflected by said third fixed mirror, and the light reflected by said third fixed mirror is coupled to said second output port in parallel with and in a reverse direction from that of the emitted light from said input port;

the total of the optical distance from said input port, via said first fixed mirror and said second fixed mirror, to said first output port and the total of the optical distance from said input port, via said moving mirror and said third fixed mirror, to said second output port are mutually equal.

An optical switch proposed as an eighth aspect of the present invention comprises, a support part supporting the end parts, mutually lined up in parallel on a substrate, of three optical waveguide parts;

a moving mirror capable of varying the relative positions with respect to said substrate;

and a first, a second, and a third fixed mirror having fixed relative positions with respect to said substrate; wherein the end part of any one optical waveguide part of the three optical waveguide parts supported by said support part is one input port of the concerned switch, and the end parts of the two remaining optical waveguide parts are the first and second output ports of the concerned switch;

said first fixed mirror reflecting the light from said input port to the side of said first output port is placed in the optical path of the emitted light from said input port;

said moving mirror is constituted to be capable of being inserted into and extracted from a position on the optical path from said input port to said first fixed mirror, and said moving mirror reflects the light from said input port to the side of said second output port when said moving mirror is inserted into said position on the optical path;

the light reflected by said first fixed mirror is further reflected by said second fixed mirror, and the light reflected by said second fixed mirror is coupled to said first output port in parallel with and in a reverse direction from that of the emitted light from said input port;

the light reflected by said moving mirror is further reflected by said third fixed mirror, and the light reflected by said third fixed mirror is coupled to said second output port in parallel with and in a reverse direction from that of the emitted light from said input port;

the end parts of said three optical waveguide parts are end parts of three single-mode optical waveguide parts;

the end part which is said input port and/or the end parts which are said two output ports have concentrating part(s);

the light field emission patterns of each end face of said end parts of single-mode optical waveguide parts which are said two output ports are identical;

the total of the optical distance from said input port, via said first fixed mirror and said second fixed mirror, to said first output port and the total of the optical distance from said input port, via said moving mirror and said third fixed mirror, to said second output port are mutually equal.

In an optical switch proposed as a ninth aspect of the present invention, the end parts of said three optical waveguide parts are supported by said support part as the positions of the three end faces thereof are lined up rectilinearly and the optical axes coupled at the same end faces are mutually lined up in parallel;

the end part of any one outer side optical waveguide part thereof is said input port, the other outer side optical waveguide part is said second output port;

the mirror faces of said first fixed mirror and said moving mirror are respectively inclined at a 45° angle, with respect to the axis of the emitted light from said input port, toward the side of said two output ports; and the mirror faces of said second fixed mirror and said third fixed mirror are respectively inclined at a 45° angle, with respect to the direction of the axis of said emitted light, toward said input port side.

In an optical switch proposed as a tenth aspect of the present invention, said moving mirror is actuated, by means of an electrostatic actuator, in a direction in the plane of said substrate which is perpendicular to the axis of the emitted light from said input port.

In an optical switch proposed as an eleventh aspect of the present invention, the end parts of said three optical waveguide parts are supported by said support part as the positions of the three end faces thereof lined up rectilinearly and the optical axes coupled at the same end faces are mutually lined up in parallel;

the end part of the center optical waveguide part thereof is said input port, the end parts of the two other optical waveguide parts, adjacent to both sides of said end part of the center optical waveguide part, are said first and second output ports; and said moving mirror is inserted in the optical path from said input port to said first fixed mirror, from said second output port side with respect to the same optical path, in a direction in the plane of the substrate, and said moving mirror is extracted from the same optical path to the same second output port side, in a direction in the plane of the substrate.

In an optical switch proposed as a twelfth aspect of the present invention, said moving mirror is constituted by coating with reflective material a plate-shaped part provided at the tip of a rod-shaped component which is actuated for insertion in and extraction from said optical path;

and said moving mirror is actuated for insertion and extraction on a track facing the rear portion of said first fixed mirror, there existing a recess, on the rear of said first fixed mirror of said substrate, which opens to face said track on which said rod-shaped component is actuated for insertion in and extraction from said optical path, and due to said recess, both side of the front and back faces of said moving mirror are left-open spaces.

In an optical switch proposed as a thirteenth aspect of the present invention, said first moving mirror and said second moving mirror are constituted respectively by coating with reflective material the plate-shaped parts provided at the tips of rod-shaped components which are actuated for insertion in and extraction from said insertion positions;

there existing obliterated parts, on the rear portions of said first moving mirror and second moving mirror of said substrate, which open to face the two tracks on which the two said rod-shaped components are actuated for insertion and extraction; and due to said obliterated parts, in positions in which said first moving mirror and said second moving mirror are each extracted from said insertion positions, respective both side of the front and back faces of the first moving mirror and the second moving mirror of said two rod-shaped components are left-open spaces.

In an optical switch proposed as a fourteenth aspect of the present invention, the end parts of said three optical waveguide parts are end parts of three optical fibers;

three grooves of rectangular cross section, mutually lined up in parallel, are formed in said substrate; and fiber pressure-applying springs of hemilingual shape are provided at each one side of inner wall of said three grooves;

said end parts of three optical fibers are placed in said three grooves one by one, said fiber pressure-applying springs respectively push the sides of said end parts of three optical fibers toward the facing inner walls of said three grooves, due to these pushing, said end parts of three optical fibers are respectively positioned on said facing inner walls;

the sides of inner wall at which said fiber pressure-applying springs are provided are mutually opposite between said grooves in which mutually optically coupled ports are respectively placed.

According to the optical switches proposed as the first to sixth, and thirteenth aspects of the present invention, it is possible, in an optical switch having one input port and two output ports, to mutually equalize the switched emitted light optically, almost to an ideal extent, by making the two optical paths related to the switching symmetric.

Also, according to the optical switches proposed as the seventh to twelfth aspects of the present invention, it is possible, in an optical switch having one input port and two output ports, to equalize the optical properties related to the intensity and the spot size of the switched emitted light, by making the optical distances of the two optical paths related to the switching the same. Especially according to the optical switches proposed as the ninth and tenth aspects of the present invention, it is also possible, in addition to the above-mentioned equalization of the optical distances, to remove the non-uniformity resulting from the polarization-dependent properties of the mirrors and to ensure a uniformity regarding the optical properties such as the polarization properties of the emitted lights by also making mutually equal the angles of the mirrors respectively present in the middle of the two optical paths being switched. In this way, it is possible to equalize the emitted light to an extent that is sufficient in relation to what is desired.

According to the optical switch proposed as the fourteenth aspect of the present invention, in an optical switch having one input port and two output ports, it is possible to optically equalize almost ideally, or to a sufficient extent, the emitted lights being switched.

According to the optical switch proposed as the third to fifth aspects of the present invention, since a moving mirror in an extracted state is disposed in the rear of a moving mirror in an inserted state, the moving mirror in the extracted state becomes shadowed by the moving mirror in the inserted state, so even if the moving mirror in the extracted state is not withdrawn greatly from the optical path, it does not occur that the moving mirror touches a light beam propagating along the optical path. Consequently, it is possible to block a condition in which light is irradiated on the moving mirror in the extracted state and cross talk is generated by the reflected light therefrom. As a result of this, according to the present invention, it is possible to shorten the actuation strokes of the moving mirrors. Especially according to the optical switch proposed as the fourth aspect of the present invention, the stroke thereof can be scaled down to almost one half of the stroke of a conventional optical switch of the moving mirror extraction type.

Also, according to the optical switch proposed as the sixth aspect and the optical switch proposed as the tenth aspect, of the present invention, it is possible, since the moving mirror present with e.g. a 45° inclination with respect to an incident light axis is actuated in a direction which is perpendicular to the same incident light axis, to scale back the actuation stroke of the same moving mirror to e.g. as little as nearly $1/\sqrt{2}$ of that in the past.

Moreover, according to the optical switches proposed as the first to fourteenth aspects of the present invention, it is possible to mutually offset the manufacturing errors relating to the positioning of the mirrors and the optical waveguide parts, maintain the mutual relative alignment of each element, and guarantee optical coupling. Specifically, regarding the configuration of the optical paths coupling the ports, with the double reflection foldback such as in the present invention, even if the faces of both mirrors related to the same double reflection are displaced symmetrically by the same quantity in a direction perpendicular to each mirror face,the optical path only varies the depth of the position of reflecting points by which the light path is folded back by the portion corresponding to the mirror displacements, and hold the coupling of the two optical axes of both ports that are kept intact. Likewise, regarding the lateral displacements of the input/output ports as well, if those displacements are of the same quantity and symmetric, the coupling of the optical axes is maintained in the same way. And then, in the case of forming a MEMS device by etching the substrate, since the structures like mirrors and grooves are all formed in the same etching process and therefore the position errors of the formed side wall faces due to excessive or deficient etching are all of the same quantity or symmetrical, manufacturing errors through this process do not exert in principle any influence on the alignments of the optical axes of the ports, advantageously.

DETAILED DESCRIPTION OF THE PREFERRED EMBODIMENT

Figure 1:
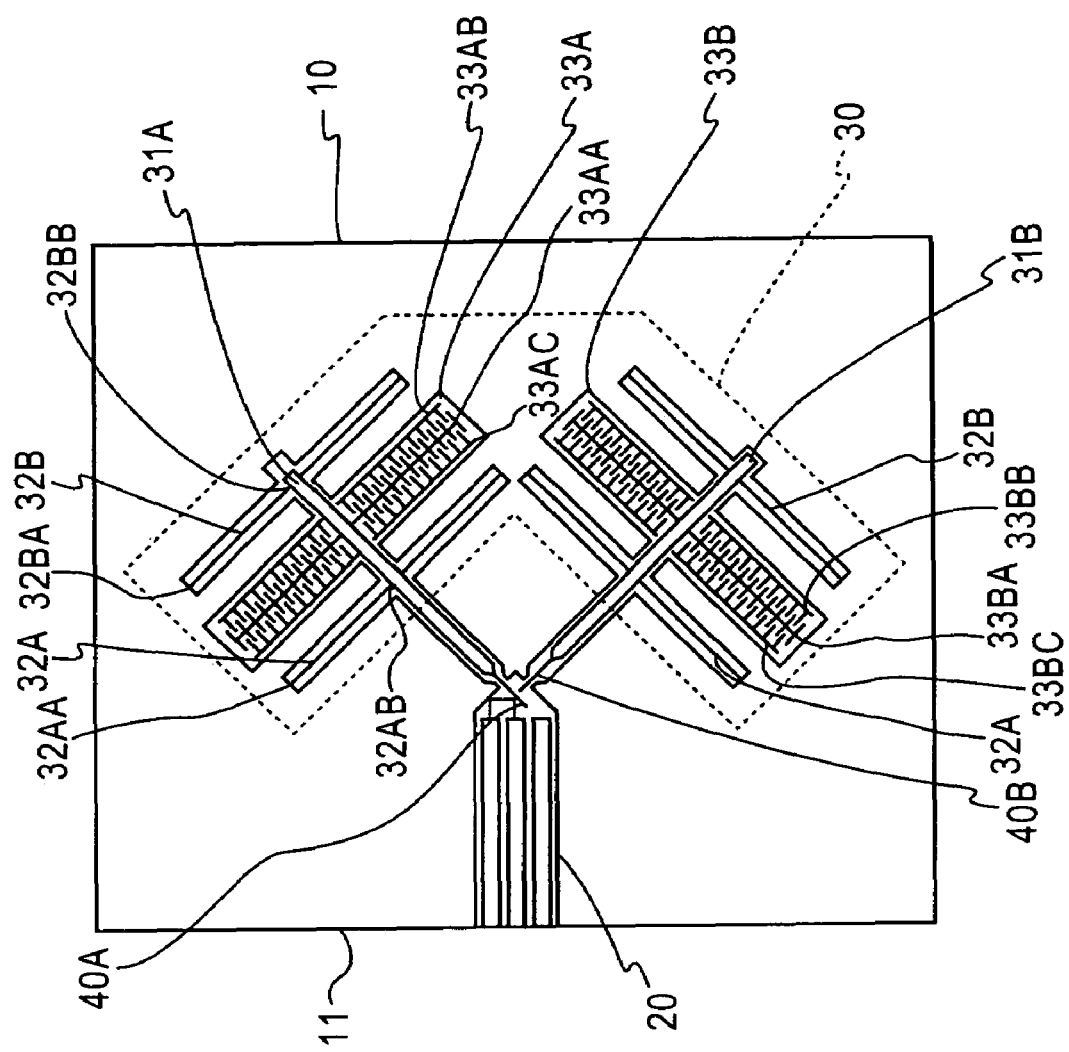
FIG. 1 is an enlarged plan view for explaining an embodiment of an optical switch of the present invention.

Hereinafter, a description will be given of a preferred embodiment of this invention.

The optical switch according to the present invention is formed on a substrate by means of micromachining technology. It is an optical switch having one input port and two output ports, a first and a second output port, which, on a substrate, has three optical waveguide parts whose end parts are supported to be mutually lined up in parallel. As for the optical waveguide parts, it is desirable to use single-mode optical waveguide parts. The present invention can fundamentally be implemented with the same element technology as for the MEMS device manufacture reported in Patent Reference 1.

With all of the first to thirteenth aspects of the present invention, the end parts of the single-mode optical waveguide parts forming the input port and the output ports of the optical switch are constituted by end parts of single-mode optical fibers, and as a MEMS device, it is suitable for it to provide a groove for fastening the end parts of the same optical fibers. Particularly in the fourteenth aspect of the present invention, these are taken to be a structurally necessary condition.

The single-mode optical fiber end part stated here is meant to include single-mode optical fiber end parts provided with a concentrating part which comprises, for instance a rod lens together with a spacer, an anti-reflection coating and the like.

An example thereof is reported in Patent Reference 4 and this can be adopted in the present invention. By further using the single-mode optical fiber end parts reported in Patent Reference 4 in combination with an antireflection coating or the technology of filling the voids of the device with a refractive index matching agent, it is possible to obtain the necessary extent of reflection prevention on the end faces.

Also, for the purpose of the prevention of reflection on the end faces, the end faces may be polished obliquely. An example thereof will not be illustrated hereinafter, but in that case, for all the embodiments of the present invention, only the three optical fibers and the grooves supporting the same have an inclination, uniformly, of several degrees with respect to the optical axis of the light incident on and emerging from each end face and are oriented to ensure mutual parallelism. This point alone differs from what is exemplified hereinafter, other portions having no changes from what is exemplified hereinafter.

Besides, it is also possible to combine the concentrating part and the prevention of reflection by using a fiber fitted with a spherical tip type lens.

It is appropriate for the positions of the end faces of the three ports to be formed in a line all together. An example thereof is not illustrated, but a mode in which a tape-shaped fiber composed of three optical fibers is placed in a guiding groove and assembled is also possible.

As for the concentrating part in which a rod lens or the aforementioned spherically tipped lens is taken to be an advantageous embodiment, it is optimal to provide the same lenses for all of the three ports, but it is also possible to choose a configuration in which a concentrating part is provided either only in the input port or only in both of the output ports, wherein a port not equipped with a concentrating part couples a conical light beam which is tapered in accordance with the angle of aperture of the end face of the same port.

Besides, it is also possible to configure an optical switch by combining a single-mode optical waveguide path substrate which is not an optical fiber with the MEMS structure of another portion. In that case, a concentrating part can be constituted in the tip of the optical waveguide path by using e.g. technology reported in Patent Reference 5.

Further, even in the case of using a multi-mode optical waveguide part for the optical waveguide part and providing a concentrating part and the like in the end part, it is of vital importance that a concentrating part be provided in the input port only or that concentrating parts having the same configuration or the same collection performance be provided in the two output ports.

First Embodiment

Figure 2:
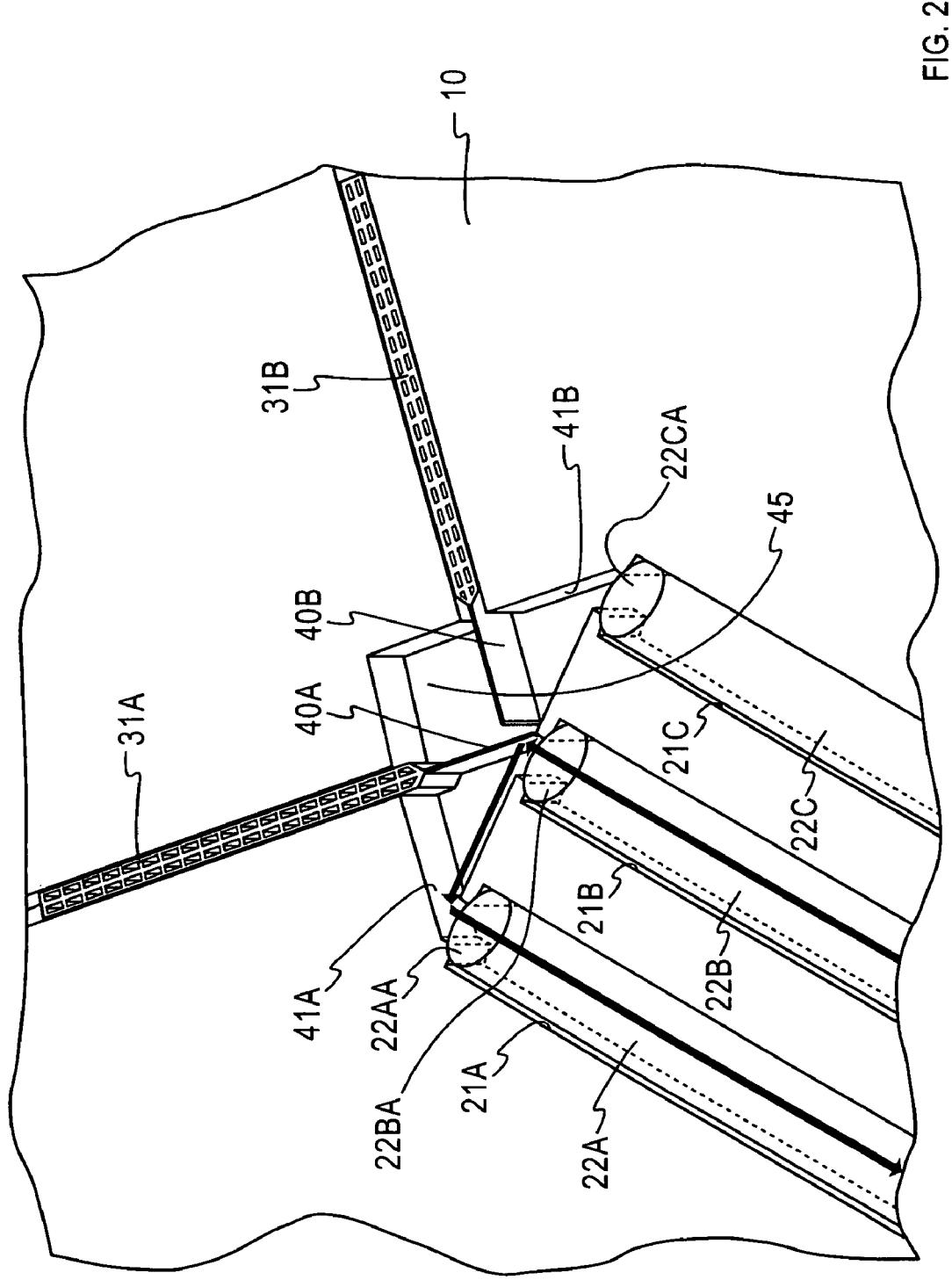
FIG. 2 is an enlarged perspective view showing a part of FIG. 1 by enlargement.

In FIG. 1 and FIG. 2, there is shown an embodiment of the optical switch proposed as the first aspect of the present invention. Reference numeral 10 in the diagram denotes a substrate, 20 denotes a support part formed in substrate 10, and 30 denotes a moving mirror actuating part, and 40A and 40B denote moving mirrors.

Substrate 10 utilizes a layered-structure substrate such as SOI (Silicon On Insulator) and has, formed therein by micromachining technology, an input and output part support part 20, a moving mirror actuating part 30, and moving mirrors 40A and 40B.

As shown enlarged in FIG. 2, input and output support part 20 of this embodiment is constituted by forming three recess grooves 21A, 21B, and 21C. Into these three recess grooves 21A, 21B, and 21C, there are respectively inserted and supported the end parts of optical waveguide parts 22A, 22B, and 22C, which are the end parts of the aforementioned single-mode optical fibers, to constitute input and output ports. The end part of optical waveguide part 22B, which is that of the three optical waveguide parts 22A, 22B, and 22C which is located in the center, is taken to be one input port, and the end parts of the other two optical waveguide parts, 22A and 22C, which are adjacent to both sides of the center part are taken to be two output ports, a first and a second output port. The emitted light from the end part of optical waveguide part 22B, the input port, is respectively switchingly deflected by reflection to the first output port (the end part of optical waveguide part 22A) side or the second output port (the end part of optical waveguide part 22C) side by means of first moving mirror 40A and second moving mirror 40B, respectively, which are switchingly inserted into positions at the same distance, on the optical path of the emitted light, from an end face 22BA of the input port. The reflected light from the same first moving mirror 40A and second moving mirror 40B is further respectively deflected by reflection in a first fixed mirror 41A or a second fixed mirror 41B, is oriented in parallel with and in a reverse direction from that of the emitted light from the input port (the end part of optical waveguide part 22B) and coupled respectively to the first and second output ports (the end parts of optical waveguide part 22A and 22C).

The optical path from first moving mirror 40A via first fixed mirror 41A to the first output port (the end part of optical waveguide part 22A) and the optical path from second moving mirror 40B via second fixed mirror 41B to the second output port (the end part of optical waveguide part 22C) are symmetrical with respect to the axis of the output light from the input port (the end part of optical waveguide part 22B).

In this embodiment, the three recess grooves 21A, 21B, and 21C are formed with a posture which intersects almost perpendicularly a side 11 of substrate 10 and mutually run parallel with the axis, and end faces 22AA, 22BA, and 22CA are arranged in a line, in a position at a desired distance from side 11. In this embodiment, there is shown the case in which the switch is operated taking the end part of optical waveguide part 22B which is inserted and supported in recess groove 21B, arranged in the center, to be the input port and taking the end part of optical waveguide part 22A and the end part of optical waveguide part 22C, which are inserted and supported in recess grooves 21A and 21C on both sides of the center groove, to be the output ports. Because of this, in this embodiment, there are provided moving mirrors 40A and 40B having planes of reflection at +45° and −45° from the optical axis of the end part of optical waveguide part 22B which is located in the center, these moving mirrors 40A and 40B being inserted and extracted with respect to the optical path of the light emitted by optical waveguide part 22B. When one moving mirror, 40A, is in a state of being inserted with respect to the optical path, the emitted light from the end part of optical waveguide part 22B is reflected to the optical waveguide part 22A side in this moving mirror 40A, is further reflected in fixed mirror 41A and incident on the end part of optical waveguide part 22A (FIG. 2). As against this, in case moving mirror 40A is extracted from the optical path of the aforementioned light and moving mirror 40B is inserted into an insertion position, the light emitted from the end part of optical waveguide part 22B is reflected in moving mirror 40B to the optical waveguide part 22C side, is further reflected in fixed mirror 41B and is switched to a state where it is incident on the end part of optical waveguide part 22C.

Fixed mirrors 41A and 41B can be formed by means of micromachining technology, by forming a face which rises steeply, perpendicularly from the plate face of substrate 10, and intersects at an angle of 45° and −45° with respect to the axis of each of recess grooves 22A and 22C, it being possible to form this face by evaporating gold or the like. (As mentioned above, in the case there is utilized a switch having end faces polished obliquely at the end parts of single-mode optical fibers, there are formed faces intersecting, at angles of +45° and −45°, the optical axis coupling the same end faces.) Moving mirrors 40A and 40B as well as rods 31A and 31B, which support and actuate the same moving mirrors 40A and 40B, are cut out from substrate 10 by means of micromachining technology, moving mirrors 40A and 40B being formed by evaporating gold or the like on the faces due to become moving mirrors.

Moving mirror actuating part 30 is also formed by means of micromachining technology. It is possible to constitute moving mirror actuating part 30 by means of the aforementioned rods 31A and 31B, bistable hinges 32A and 32B which move in an axial direction, as well as stabilize and retain, these rods 31A and 31B, and electrostatic actuators 33A and 33B which actuate moving mirrors 40A and 40B to an insertion position and an extraction position with respect to the optical path.

As for hinges 32A and 32B, two recess grooves are formed in parallel in the face of substrate 10 and lamellae are formed in the respective center positions of these two recesses, these lamellae being utilized as hinges 32A and 32B. Hinges 32A and 32B have one end 32AA and 32BA respectively linked to substrate 10, the other ends 32AB and 32BB being respectively linked to rods 31A and 31B. Hinges 32A and 32B are in the initial state formed to be curved respectively between the fixed ends (the first ends 32AA and 32BA) and the points of linkage with rods 31A and 31B (the other ends 32AB and 32BB), and due to this curving, the fixed ends (the first ends 32AA and 32BA) are formed to be longer than the distance to rods 31A and 31B, so by means of this excess length, a first and another bistable operation are made possible.

Electrostatic actuators 33A and 33B can respectively be constituted by arranging the respective interdigitated fingers of movable interdigitated electrodes 33AA and 33BA, which are respectively integrally formed with rods 31A and 31B, and fixed interdigitated electrodes 33AB and 33AC and 33BB and 33BC, respectively attached to and formed on substrate 10 in pairs, to be oriented toward each other. This movable interdigitated electrode 33AA is connected to ground and if a voltage is applied to either one of fixed interdigitated electrodes 33AB and 33AC, the same movable interdigitated electrode 33AA is attracted to that of the fixed interdigitated electrodes 33AB and 33AC to which the voltage is applied, making it possible to move moving mirror 40A in e.g. the insertion direction. If a voltage is applied to the other of fixed interdigitated electrodes 33AB and 33AC, it is possible, by means of the same attractive force, to move moving mirror 40A in e.g. the extraction direction. Similarly, if movable interdigitated electrode 33BA is connected to ground and a voltage is applied to either one of fixed interdigitated electrodes 33BB and 33BC, the same movable interdigitated electrode 33BA is attracted to that of fixed interdigitated electrodes 33BB and 33BC to which the voltage is applied, making it possible to move moving mirror 40B in the insertion direction or the extraction direction.

Since the method of forming moving mirrors 40A and 40B, the method of forming moving mirror actuating part 30 as well as the structure thereof have already been described in the aforementioned Patent References 1 to 3, an explanation beyond this will be omitted here.

Hereinafter, an explanation will be given regarding the unique working effects of the present invention. In the embodiment shown in FIG. 1 and FIG. 2, the optical path from the end part of optical waveguide part 22B forming the input port via moving mirror 40A and fixed mirror 41A to the end part of optical waveguide part 22A forming an output port and the optical path via moving mirror 40B and fixed mirror 41B to the end part of optical waveguide part 22C are formed to be completely symmetrical. Further, in the case of a configuration in which at least the end part of optical waveguide parts 22A, and 22C are provided with a concentrating part or the like, the two output ports, i.e. optical waveguide parts 22A and 22C, are provided preferably with lenses or the like which are entirely the same or at least with elements such that the light field emission patterns at the end faces of the two coincide. In this way, since the two light beams having the same conditions impinge upon the two end faces of the end parts, and the conditions of the end parts of the optical waveguide parts coupled by the same light beams are also taken to be the same, then consequently two output lights which are entirely equivalent in properties propagate through the two optical waveguide parts 22A and 22C to be obtained as output.

Further, what is here stated as "the light field emission patterns coincide" refers to the fact that, in the case where single-mode propagation light is emitted in reverse from respectively the end faces of the end parts of single-mode optical waveguide parts 22A and 22C, both of the mode field patterns (field magnitude distribution patterns) and the optical phase distribution patterns formed at the end faces 22AA and 22CA thereof become the same, respectively, or in other words the mode field patterns at the end faces 22AA and 22CA are equivalent and at the same time the equiphase wave surfaces at the end faces 22AA and 22CA are equivalent. Specifically, in practice, the configuration of the end parts of optical waveguide parts 22A and 22C may be taken to be the same, but e.g. in the case of using concentrating parts employing rod lenses, it does not matter if there is a difference in the lengths of the two lenses corresponding to an integral multiple of the pitch.

Further, in the embodiment shown in FIG. 1 and FIG. 2, since a structure was chosen using two moving mirrors 40A and 40B and switching the reflection direction of the light, it is possible to obtain the working effect that the stroke of movement of each moving mirror 40A and 40B can be reduced. The situation thereof is shown using FIG. 3. In the diagram shown in FIG. 3, a configuration is shown in which there is carried out the operation of first advancing the moving mirror in the insertion position and then starting the movement thereof in the extraction direction and, exactly when the moving mirror in movement has completely reached the extraction position, starting the movement of the moving mirror which had been in the extraction position.

Moreover, the term "drive signal #1" appearing hereinafter signifies a signal indicating either a "logical 1" or a "logical 0" for the purpose of controlling electrostatic actuator 33A. Further, electrostatic actuator 33A moves moving mirror 40A to the insertion position in case drive signal #1 is a logical 1, and performs actuation to move moving mirror 40A to the extraction position in case drive signal #1 is a logical 0. Also, the term "drive signal #2" signifies a signal indicating either a "logical 1" or a "logical 0" for the purpose of controlling electrostatic actuator 33B. Further, electrostatic actuator 33B moves moving mirror 40B to the insertion position in case drive signal #2 is a logical 1, and performs actuation to move moving mirror 40B to the extraction position in case drive signal #2 is a logical 0.

Figure 3:
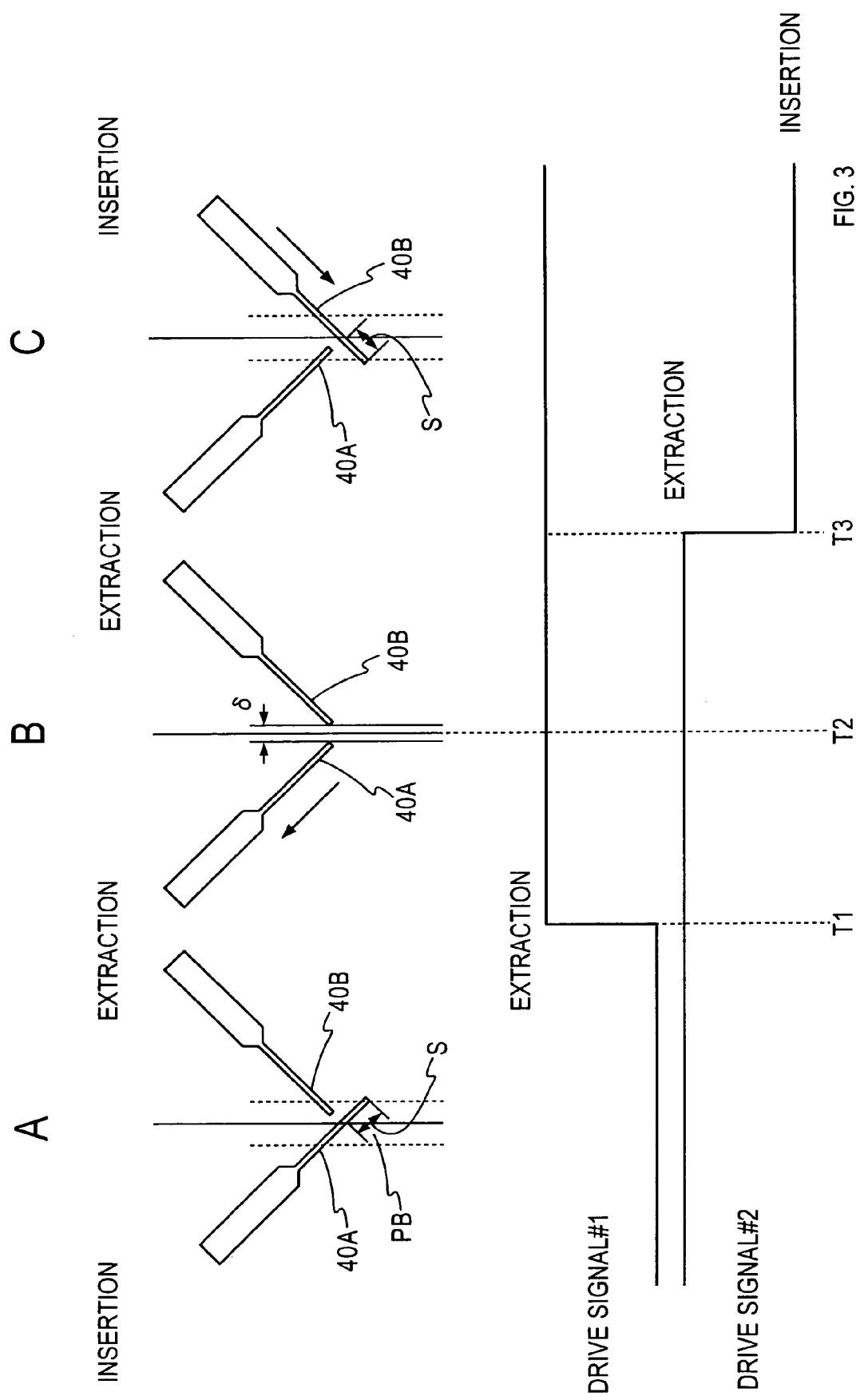
FIG. 3 is a diagram for explaining the moving mirror operation which is a distinguishing feature of the present invention.

Diagram A of FIG. 3 shows the situation of moving mirror 40A being in the insertion position and, by being in this insertion position, receiving a beam PB to nearly 100% and reflecting it. In this situation, drive signal #1 is next inverted, at a timing T1, to a logical 1 and by this inversion of drive signal #1, the movement of moving mirror 40A to the extraction position is started, the mirror taken to reach the extraction position at a timing T2. This is the situation of diagram B of FIG. 3. Next, at a timing T3 by which there has elapsed a time to check that moving mirror 40A has completely come to a halt, drive signal #2 is inversed. By this inversion of drive signal #2, moving mirror 40B is moved in the insertion direction and arrives at the insertion position after a prescribed time (diagram C of FIG. 3).

In this way, by operating two moving mirrors, 40A and 40B, according to a sequenced operation programmed in advance, it is possible to define the extraction position at the vicinity of the axis of light beam PB where the moving mirror is to remain within the light path region(moving mirror 40A and moving mirror 40B are extracted and come to a halt in the vicinity of the axis of the light beam). As a result of this, it comes about that, for the stroke from the extraction position up to the insertion position, one can make do with a distance S traversing the radial portion of light beam PB obliquely in a direction at 45° from the position of the axis of light beam PB, so it is possible to reduce the stroke of moving mirror 40A and moving mirror 40B. Specifically, it is assumed that the broken lines drawn in the extension of light beam PB in the diagram express the range in which influence is exerted on the isolation performance of the optical switch. In the case of a conventional optical switch of the mirror insertion and extraction type, in order for the extracted moving mirror not to reflect the energy of the incident light to a zone equal to or greater than the limit of the isolation specification thereof, it must be located outside the aforementioned range. As against this, in the case of the present invention, it is possible to position moving mirrors 40A and 40B in the interior of the range of the broken lines in the diagram and moreover, by adopting the same to be in the vicinity of the axis of the light beam, as stated above, it is possible to reduce the stroke to nearly one half of the conventional value, as may be appreciated from the diagram.

Figure 4:
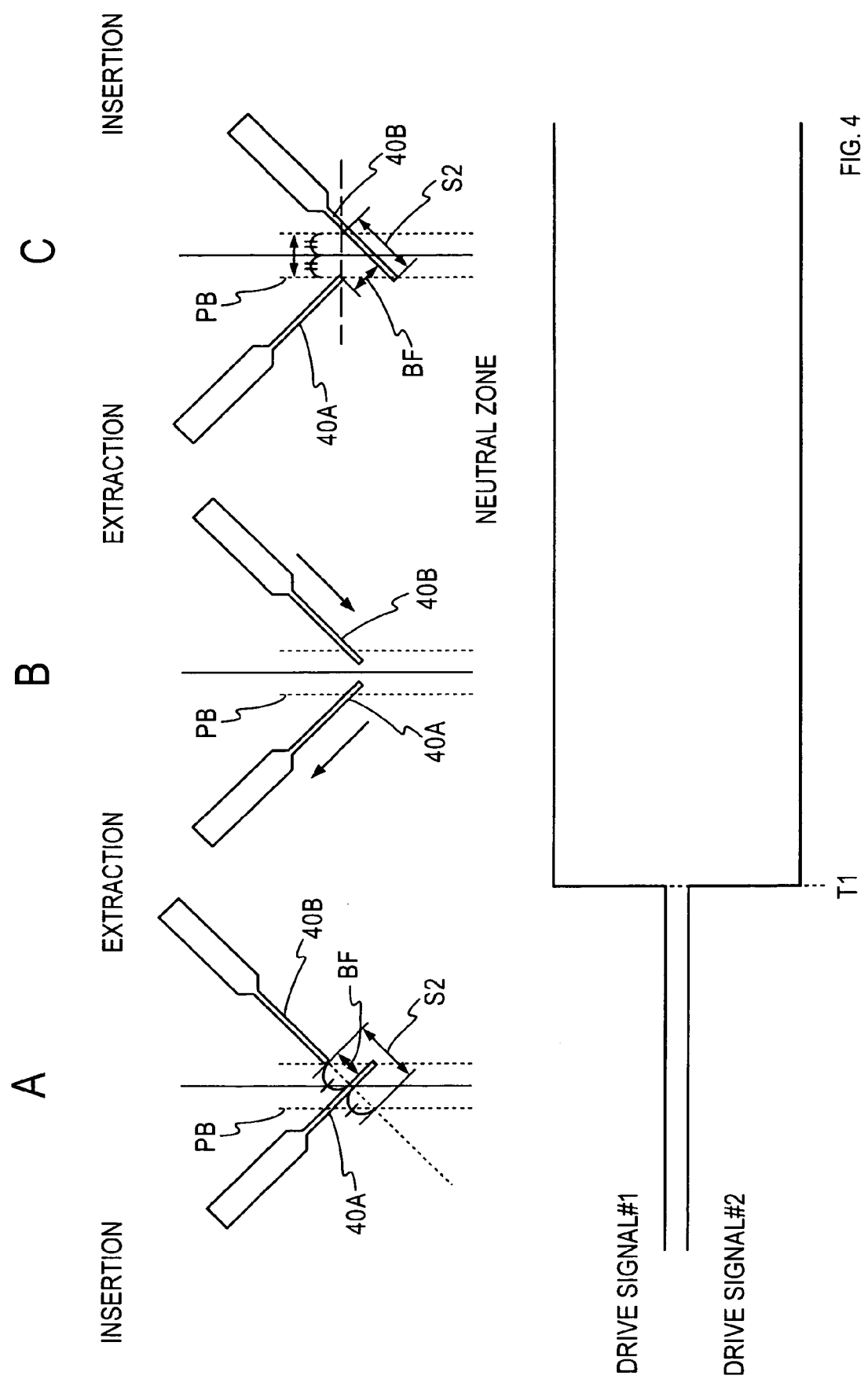
FIG. 4 is a diagram for explaining another moving method for the moving mirrors.

In FIG. 4, there is shown a configuration in which another actuation method is carried out. The actuation method shown in FIG. 4 is a method in which the two moving mirrors 40A and 40B are not operated sequentially but rather, drive signals #1 and #2 are inverted simultaneously, so the operations end up being started simultaneously. Diagram A of FIG. 4 indicates a situation in which moving mirror 40A is in the insertion position and moving mirror 40B is in the extraction position. What should be paid attention to here is that the tip of moving mirror 40B, which is in the extraction position, is not in the vicinity of the axial position of the light beam such as in the case of FIG. 3 but is located at a point further retreated from the axis thereof by a neutral zone BF only, along the actuation direction. In other words, in order to operate moving mirror 40A and 40B simultaneously, a case is shown wherein a neutral zone BF is provided, in order not to join the moving mirrors physically up against each other, as an actuation distance margin between moving mirror 40A in the insertion position and moving mirror 40B in the extraction position, so that even if the two moving mirrors 40A and 40B start to move simultaneously, they do not join up physically against each other while the movement is in progress.

In this case, drive signals #1 and #2 are simultaneously inversed at timing T1 to start the movement of the two moving mirrors 40A and 40B at the same time. Diagram B of FIG. 4 shows the same situation while the movement is in progress; after moving mirror 40A has left open the path of moving mirror 40B, moving mirror 40B reaches a position cutting across the axis of light beam PB, and so a mutual collision is avoided. Diagram C of FIG. 4 shows the situation where moving mirror 40A has reached the extraction position and moving mirror 40B has reached the insertion position.

Consequently, in the case of adopting this actuation method, the stroke S2 required by each moving mirror 40A and 40B becomes a distance consisting of the stroke S in the case of FIG. 3 mentioned above to which is added the aforementioned neutral zone BF. In FIG. 4, there is shown a design example in which a distance is adopted for the size of neutral zone BF which is a distance (the distance from an axial position of light beam PB cutting across the radial portion of light beam PB obliquely at an angle of 45°) nearly identical to the aforementioned distance S. In this example, since the moving mirror in the extraction position reaches beyond the aforementioned range in which an influence is exerted on the isolation performance, the size of stroke S2 does not change from the case of the aforementioned prior art. However, when forming the bistable hinge in the device of the present invention by etching, if the positions at which the two moving mirrors 40A and 40B are in their respective extracted states are manufactured as the natural states (the first stable states) in accordance with an etching mask and the inserted states are chosen to be the state (the second stable states) which are obtained by inverting the hinges therefrom, the distance of neutral zone BF is made even smaller than in the example of FIG. 4, i.e. by choosing the extraction positions of the moving mirrors to be in the interior of the aforementioned range in which an influence is exerted on the isolation performance, so it is possible to make stroke S2 smaller than the prior art. This is because, generally, in the case of a hinge like this, the operation of reaching the first stable state from the second stable state can be completed more rapidly than the opposite process. Moreover, the fact that this is possible is due to the fact that there can be obtained the advantage that there is no influence on the reflected light as long as the positional misalignment of the inserted state is in the actuation direction, since the actuation direction of the moving mirrors is parallel to the direction of the faces of the same mirrors in the present embodiment, even if the second stable state, for which it is relatively more difficult to get position accuracy compared to the first stable state and which is normally preferred for being chosen as the extracted state, is chosen to be the inserted state in which light is reflected.

If a comparison is made of the actuation method shown in FIG. 3 and the actuation method shown in FIG. 4, there is a slight cost incidence on the means of generating drive signals #1 and #2 according to the actuation method shown in FIG. 3 in return for the fact that the advantage can be obtained that it is possible to reduce the required stroke, since the switching timing of drive signals #1 and #2 must be programmed in advance. As against this, according to the actuation method shown in FIG. 4, in return for the possibility to configure the generating means for drive signals #1 and #2 easily, the required stroke becomes slightly longer.

Next, an explanation will be given regarding the working effect that there occurs no misalignment of the optical axis with respect to manufacturing errors related to the present invention.

That is to say that, in the optical switch of the present invention, it has been explained that the whole of the switch, including input and output support part 20, is formed by micromachining technology. Micromachining technology is a technology in which grooves and the like are formed in the substrate, mainly by etching, and by means of the formation of grooves, there are formed input and output support part 20, moving mirrors 40A and 40B, and moving mirror actuating part 30.

Here, there is particularly considered the case in which the groove width of recess grooves 21A, 21B, and 21C constituting input and output support part 20 shown in FIG. 2 have not quite been finished with the planned dimensions. In the case where the side etching quantity is insufficient, recess grooves 21A, 21B, and 21C are formed with a width which is smaller than the planned dimensions. In the case where the side etching quantity is in excess, the recess grooves are formed having the same width greater than the planned dimensions. For the planned dimensions, since micromachining technology has a property like this, the dimensions are in practice set to dimensions which are slightly bigger than the diameter of the optical fiber to be inserted, devising the switch so that the optical fiber can without exception be inserted in the groove, even if there is an excess or a deficiency in the side etching quantity.

In this invention, there is proposed a method which skillfully utilizes the properties of this micromachining technology to offset the misalignment of the optical axis between the input and output ports. In this embodiment, there are in particular provided, to recess grooves 21A and 21B which are a pair mutually adjacent among the three recess grooves 21A, 21B, and 21C formed to be mutually parallel, fiber pressure-applying springs biasing in a mutually approaching direction optical waveguide pars 22A and 22B which are respectively supported by the same recess grooves. Further, there are provided, to recess grooves 21B and 21C which make up the other pair thereof, fiber pressure-applying springs biasing in a mutually separating direction optical waveguide parts 22B and 22C which are respectively supported by the same recess grooves. The reference numerals 23A, 23B, and 23C indicated in FIG. 5 denote these fiber pressure-applying springs. In other words, the fiber pressure-applying springs 23A and 23B, which are respectively provided to recess grooves 21A and 21B, bias optical waveguide parts 22A and 22B in a mutually approaching direction by application of pressure. The fiber pressure-applying springs 23B and 23C, which are respectively provided to recess grooves 21B and 21C, bias optical waveguide parts 22B and 22C in a mutually separating direction by application of pressure. In this way, by having fiber pressure-applying springs 23A, 23B, and 23C provided, even if an error has occurred in the dimensions of recess grooves 21A, 21B, and 21C, it is possible to devise the switch so that there arises no misalignment in the optical axis between the input port and the output ports due to the same dimensional error.

Figure 5:
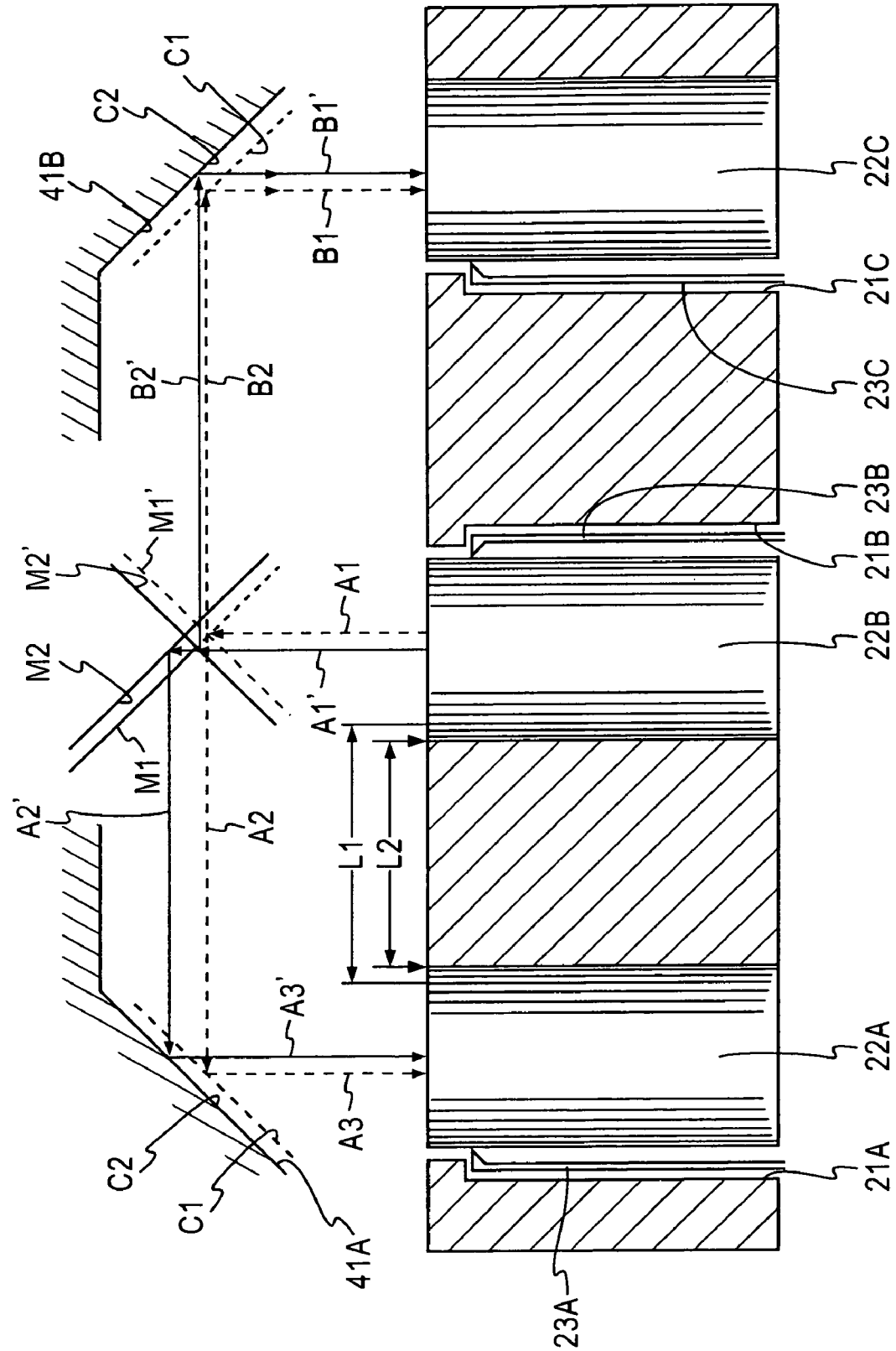
FIG. 5 is a plan view for explaining the reason why optical axis offsets due to manufacturing errors do not occur, something which is another distinguishing feature of the present invention.

Reference numerals L1 and L2 indicated in FIG. 5 denote dimensional errors of recess grooves 21A, 21B, and 21C arising from an etching excess or deficiency. Numeral L1 denotes the opening between recess grooves 21A and 21B in the case of a deficiency in the side etching quantity. Numeral L2 denotes the spacing between recess grooves 21A and 21B in the case where the side etching quantity is greater than in the case of opening L1. Moreover, M1 denotes the position of the reflective face of moving mirror 40A formed by the etching forming opening L1, and M2 denotes the position of the reflective face of moving mirror 40A formed by the etching forming opening L2. Also, C1 denotes the positions of the reflective faces of fixed mirrors 41A and 41B formed during the etching with which opening L1 was formed and C2 denotes the positions of the reflective faces of fixed mirrors 41A and 41B formed during the etching with which opening L2 was formed.

If, in case opening L1 is formed, the optical path of the light emitted from the end part of optical waveguide part 22B is A1, then the optical path of the light emitted from the end part of optical waveguide part 22B becomes A1' in case opening L2 is formed. The light of optical path A1 is reflected in reflective face M1, is reflected via optical path A2 in reflective face C1 and, via optical path A3, is made incident on the axis of the end part of optical waveguide part 22A.

Here, in the case of a change in opening L2 due to an error in the side etching quantity, the reflective faces of the mirrors are changed, due to the same error in the side etching quantity, from M1 to M2 and from C1 to C2. As a result of this, the light emitted from the end part of optical waveguide part 22B with an optical path A1' is reflected in reflective face M2, is reflected via an optical path A2' in reflective face C2, and, through an optical path A3', is incident on the optical axis of the end part of optical waveguide part 22A. In other words, even if the opening between optical waveguide parts 22A and 22B is changed from L1 to L2, the same etching error operates on the reflective faces of the mirrors as well, and since the positions of the reflective faces of the mirrors are changed by the same amount only, the optical coupling, to make a synthesis, is maintained between optical waveguide parts 22A and 22B.

Regarding between optical waveguide parts 22B and 22C, one optical waveguide part 22B is biased in the direction away from optical waveguide part 22C by means of springs 23B, other optical waveguide part 22C is biased in the direction away from optical waveguide part 22B by means of springs 23C.

In this case, if the optical axis of optical waveguide part 22C supported by recess groove 21C formed by the etching with which opening L1 is formed is taken to be B1, the reflective face of fixed mirror 41B is taken to be C1, and the reflective face of moving mirror 40B is taken to be M1', the light emitted from the end part of optical waveguide part 22B is reflected from optical path A1 in reflective face M1', is reflected via optical path B2 in reflective face C1, and is incident on optical axis B1 of optical waveguide part 22C.

As against this, in case opening L2 is formed, the light emitted from the end part of optical waveguide part 22B is moved to optical path A1'. The light emitted with optical path A1' is reflected in a reflective face M2' and is reflected, via an optical path B2', in reflective face C2. At this point, since the optical axis of the end part of optical waveguide part 22C moves to B1', the light reflected in reflective face C2 is incident on optical axis B1' of the end part of optical waveguide part 22C. Consequently, for whichever of the output ports, a misalignment of the optical axis resulting from an etching error is blocked.

Second Embodiment

Figure 6:
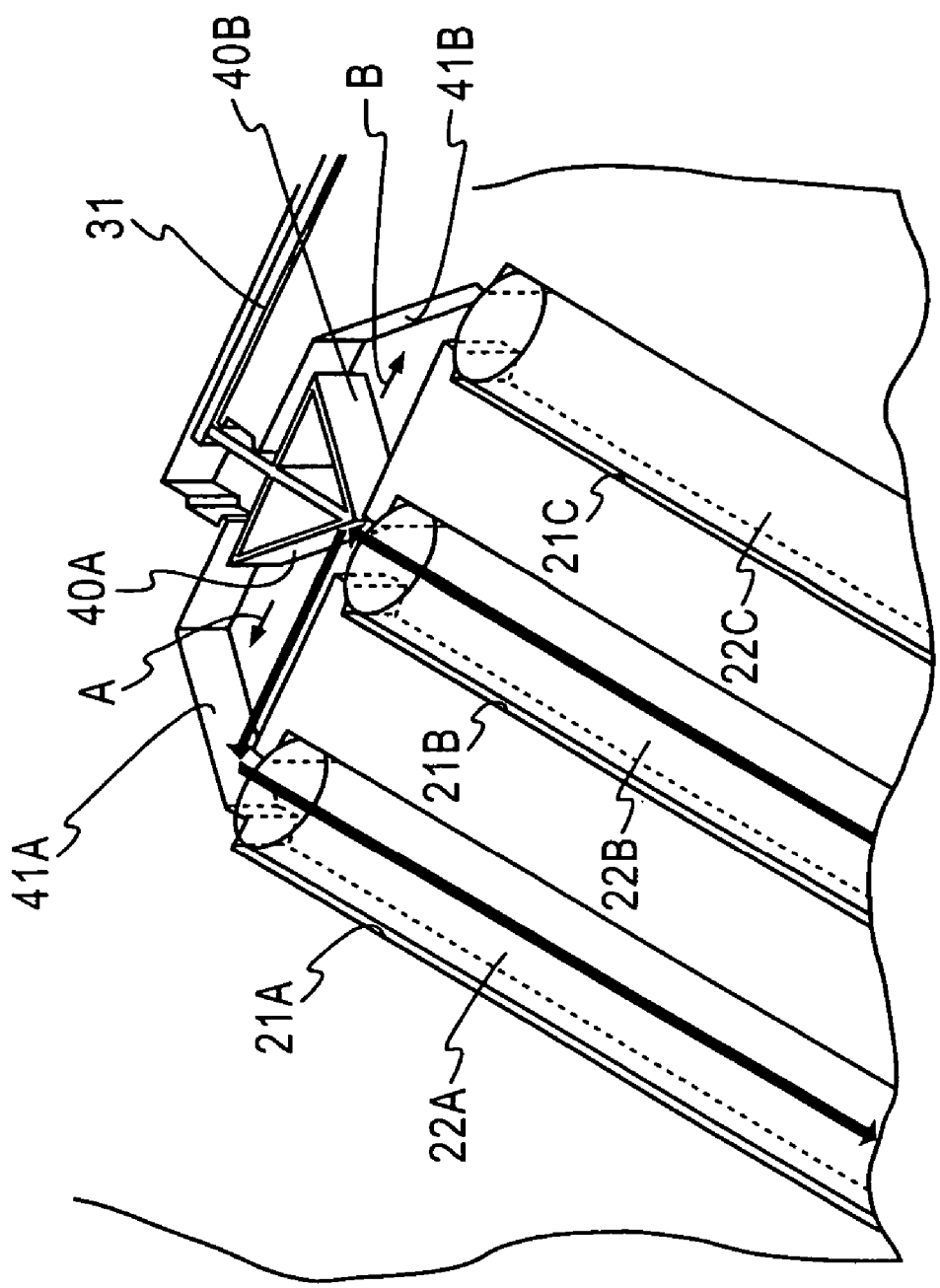
FIG. 6 is an enlarged perspective view for explaining a variation of the present invention.

In FIG. 6, there is shown an embodiment of an optical switch proposed as the sixth aspect of this invention. In this embodiment, there is shown a structure in which moving mirrors 40A and 40B are combined and moving mirrors 40A and 40B are actuated as one by a single rod 31. Moving mirrors 40A and 40B have reflective faces which are formed monolithically in a position crossing each other at an angle of 90°. These moving mirrors 40A and 40B are formed together with rod 31 by being cut out from substrate 10 by means of micromachining technology. Rod 31 is actuated by means of an actuating part like moving mirror actuating part 30 explained in FIG. 1 and moves moving mirrors 40A and 40B in the directions of arrow A and arrow B. If moving mirrors 40A and 40B are moved in the direction of arrow B, moving mirror 40A faces the optical axis of the end part of optical waveguide part 22B and, by the reflective face thereof, the light emitted from the end part of optical waveguide part 22B is reflected to fixed mirror 41A. The light reflected to fixed mirror 41A is further reflected by fixed mirror 41A, is made incident on the end part of optical waveguide part 22A acting as an output port, and is output in a direction opposite from that of the input light.

If moving mirrors 40A and 40B are moved in the direction of arrow A, moving mirror 40B faces the end face of optical waveguide part 22B. In this case, the light emitted from the end part of optical waveguide part 22B is reflected in moving mirror 40B, is further reflected in fixed mirror 41B, is incident on optical waveguide part 22C, and output in a direction opposite from that of the input light.

Further, the existence of fiber pressure-applying springs 23A, 23B, and 23C respectively biasing optical waveguide parts 22A, 22B, and 22C in one direction is not shown in FIG. 1, FIG. 2, or FIG. 6, but in the same way as explained in FIG. 5, fiber pressure-applying springs 23A, 23B, and 23C may be provided to recess grooves 21A, 21B, and 21C in FIG. 1, FIG. 2, and FIG. 6.

According to the embodiment shown in this FIG. 6, there is the advantage that, since it is sufficient with one set for moving mirror actuating part 30 and rod 31, miniaturization is possible.

Third Embodiment

Figure 7:
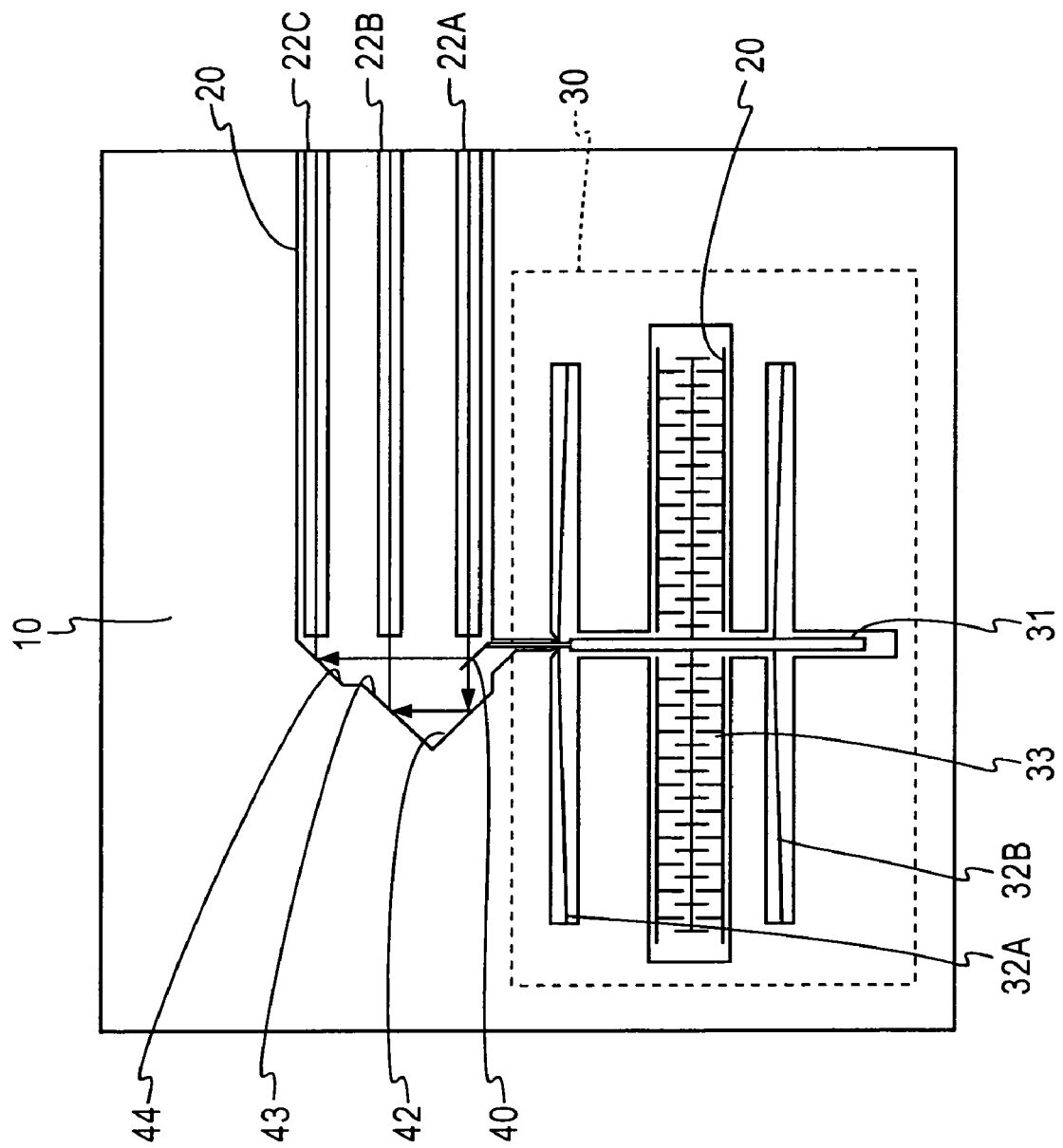
FIG. 7 is an enlarged plan view for explaining yet another variation of the present invention.

In FIG. 7, there is shown an embodiment of an optical switch proposed as the seventh aspect of this invention. Structural distinguishing features of this embodiment are the point that the end part of either one of the optical waveguide parts located on both sides of the center of the three optical waveguide parts 22A, 22B, and 22C which are mutually parallel and supported by support part 20, is operated as an input port, the end parts of the other two optical waveguide parts being operated as output ports, and the point that a structure is chosen in which the moving mirrors are moved in a direction intersecting at right angles with the axis of the optical path.

In the embodiment shown in FIG. 7, the end part of optical waveguide part 22A supported at a position close to moving mirror actuating part 30 is taken to be the input part and the end parts of the other two optical waveguide parts, 22B and 22C, are taken to be the output ports.

Rod 31 is shaped in a posture wherein the axis is oriented in a direction crossing at right angles with the axis of the light beam emitted from the end part of optical waveguide part 22A acting as the input port. Rod 31 is actuated by means of moving mirror actuating part 30 of a similar structure to that explained in FIG. 1, moving mirror 40 with which it is provided being moved in a direction crossing at right angles with the optical path of the light emitted by the end part of optical waveguide part 22A. In this way, moving mirror 40 can be arranged in the insertion position or the extraction position.

Moving mirror 40 is formed at the tip of rod 31 in a posture intersecting at an angle of 45° with respect to the axis of rod 31 and reflects the light emitted from the end part of optical waveguide part 22A at an angle of 90° to bend over the optical path. If moving mirror 40 is extracted, by means of the actuating power of moving mirror actuating part 30, from the optical path of the light emitted from the end part of optical waveguide part 22A, the light emitted from the end part of optical waveguide part 22A penetrates the position where moving mirror 40 was present and irradiates a first fixed mirror 42. First fixed mirror 42 has a reflective face arranged to be facing at the same angle as the reflective face of moving mirror 40 and reflects the light emitted from the end part of optical waveguide part 22A at an angle of 90° to bend over the optical path. In the axis of the light beam coupled to optical waveguide part 22B located in the center, there is provided a second fixed mirror 43 having a reflective face intersecting, at an angle of 90°, the reflective face of first fixed mirror 42. Further, in the axis of the light beam coupled to optical waveguide part 22C, there is provided a third fixed mirror 44 having a having a posture which runs parallel to the reflective face of second fixed mirror 43. By means of these mirrors, first fixed mirror 42, second fixed mirror 43, and third fixed mirror 44, the light emitted from the end part of optical waveguide part 22A is switched to a state of being made incident on either of optical waveguide part 22B and optical waveguide part 22C, depending on the extraction position of moving mirror 40.

In other words, when moving mirror 40 moves to the extraction position, the light emitted from the end part of optical waveguide part 22A is reflected in first fixed mirror 42 and second fixed mirror 43 and is incident on the end part of optical waveguide part 22B located in the center. If moving mirror 40 moves to the insertion position, the light emitted from the end part of optical waveguide part 22A is reflected in moving mirror 40, is reflected in third fixed mirror 44, and in incident on optical waveguide part 22C.

Here, the positions of first fixed mirror 42, second fixed mirror 43, and third fixed mirror 44 are selected so that the optical path length of the optical path from optical waveguide part 22A and incident on optical waveguide part 22B via first fixed mirror 42 and second fixed mirror 43 and the optical wave length from optical waveguide part 22A to optical waveguide part 22C via moving mirror 40 and third fixed mirror 44 become equal.

According to the structure of this embodiment, since one set is sufficient for moving mirror actuating part 30, it is possible to reduce the size thereof in comparison with that of an optical switch using two sets for the moving mirror actuating part. Further, since actuation is carried out in a direction at right angles with the optical path of moving mirror 40, it is in principle sufficient for the stroke of moving mirror 40 to have a distance corresponding to the width of the range in which influence is exerted on the aforementioned isolation performance of the light beam. In other words, if cross talk is taken into account, it is necessary to insert and extract the moving mirror into or from a position in which it is sufficiently inserted or extracted with respect to the range in which the energy of the light beam exists, but in comparison with the case of a structure in which the single moving mirror reported in the aforementioned Patent References 1 to 3 is inserted or extracted at an angle of 45° with respect to the axis of the light beam, the actuation stroke of moving mirror 40 of the present embodiment can be reduced to the order of $1/\sqrt{2}$.

Fourth Embodiment

Figure 8:
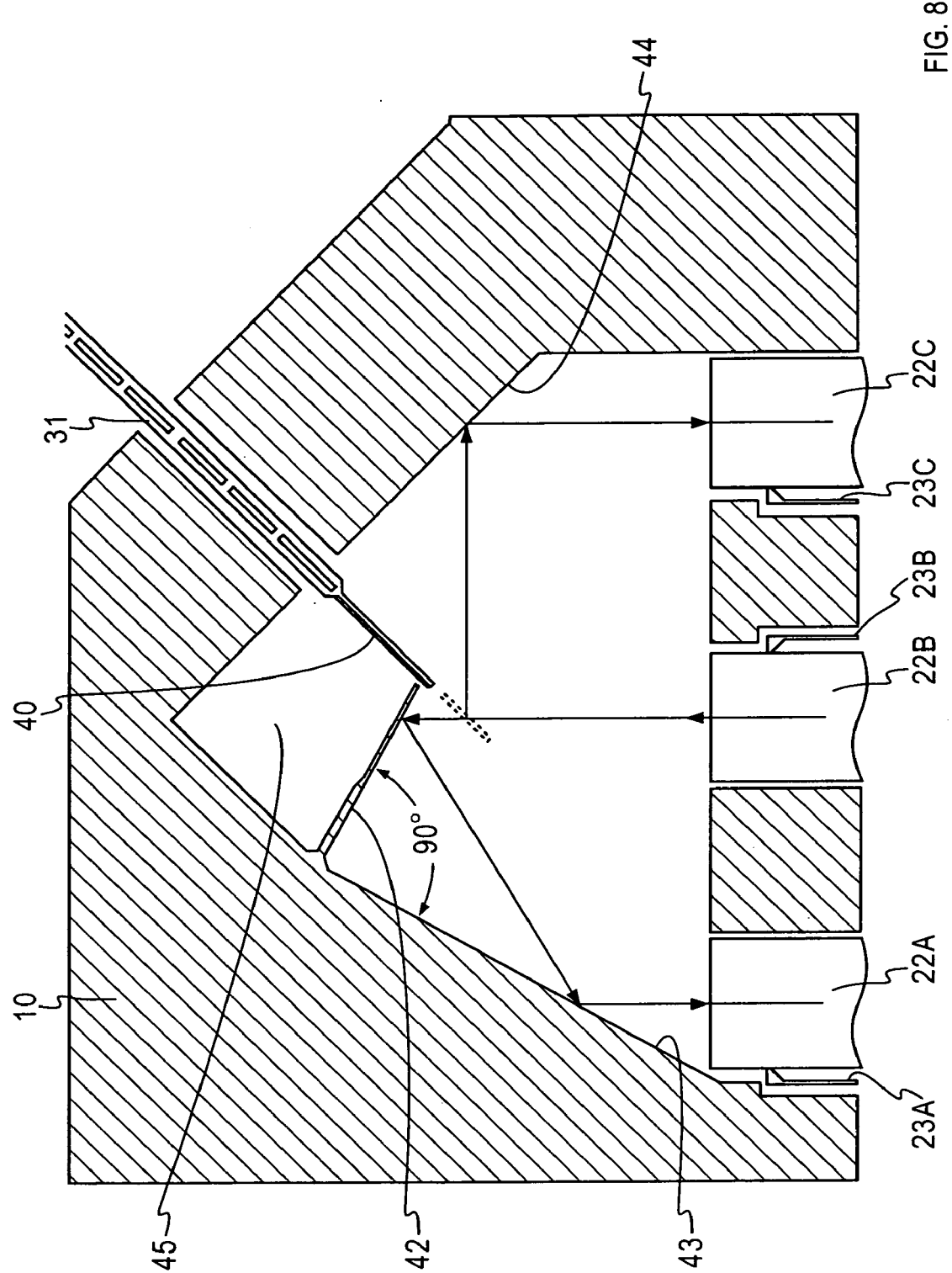
FIG. 8 is an enlarged plan view for explaining yet another variation of the present invention.

In FIG. 8, there is shown an embodiment of an optical switch proposed as the eleventh aspect of the present invention. In FIG. 8, a portion of the moving mirror actuating part is omitted, but in reality, moving mirror 40 is actuated to the insertion position and the extraction position by means of moving mirror actuating part 30 shown in FIG. 1 or FIG. 7. In this embodiment, there is shown the case of a configuration in which the end part of optical waveguide part 22B located in the center position of the three optical waveguide parts 22A, 22B, and 22C supported by support part 20 is operated as an input port, and the end parts of optical waveguide parts 22A and 22C, arranged on both sides of the center part, are operated as output ports.

For this reason, first fixed mirror 42 is arranged in the axis of the light beam emitted from the end part of optical waveguide part 22B and, further, second fixed mirror 43 is arranged in the axis of the light beam coupled to optical waveguide part 22A. Further, third mirror 44 is arranged in the axis of the end part of optical waveguide part 22C. First fixed mirror 42 and second fixed mirror 43 are in a relationship of crossing each other at 90°, the light emitted from the end part of optical waveguide part 22B is reflected in first fixed mirror 42, and if the reflected light thereof is reflected in second fixed mirror 43, the optical path of the same reflected light becomes an optical path parallel with the light incident on first fixed mirror 42.

Between the end part of optical waveguide part 22B and first fixed mirror 42, moving mirror 40 is inserted and extracted. The reflective face of moving mirror 40 is taken to have a posture of intersecting at 45° with respect to the axis of the light beam emitted from the end part of optical waveguide part 22B and in a situation where the moving mirror is inserted in the optical axis of the light beam emitted from the end part of optical waveguide part 22B, the light emitted from the end part of optical waveguide part 22B is reflected to the side of third fixed mirror 44. Third fixed mirror 44 has an oblique face intersecting at 45° with each optical axis of the end parts of optical waveguide parts 22A to 22C. As a result of this, if the light reflected in moving mirror 40 is reflected in third fixed mirror 44, the result is that the same reflected light has a parallel relationship with each end part of optical waveguide parts 22A to 22C.

In the final analysis, in this embodiment, the light emitted from the end part of optical waveguide part 22B is reflected in first fixed mirror 42 and second fixed mirror 43 and is incident on the end part of optical waveguide part 22A, in case moving mirror 40 is present in the extraction position. Also, in case moving mirror 40 is present in the insertion position, the light emitted from the end part of optical waveguide part 22B is reflected in moving mirror 40 toward third fixed mirror 44 and is incident, via third fixed mirror 44, on the end part of optical waveguide part 22.

Even in this mode of the invention, the optical path lengths of the two optical paths from optical waveguide part 22B and going respectively to the end parts of optical waveguide parts 22A and 22C are constituted equivalently and in order to fulfill the same conditions, the angles and the like are determined with respect to the incident light of first fixed mirror 42. If a comparison is made with Embodiment 3, the configuration of Embodiment 4 has, regarding the two switchable optical paths, respective angles of incidence of moving mirror 40 and first fixed mirror 42 and of third fixed mirror 44 and second fixed mirror 43, which are not mutually symmetric with respect to each other. However, in the configuration of Embodiment 4, by the fact of choosing the end part of the center optical waveguide part 22B to be the input port, the optical switching is constituted by optical coupling between the adjacent ports, so it is possible to making the absolute length of the optical path shorter than in Embodiment 3.

This embodiment is characterized by the point of the advantage of being able to obtain a miniaturization since it is possible to make a configuration by means of a single moving mirror 40 and moving mirror actuating part, and, further, by a structure in which a recess 45 is formed on the back face side of first fixed mirror 42. This structure is one which is proposed as the twelfth aspect of the present invention and has for its object the point of being able, in the manufacturing process, to form evaporated layers with uniform density on both faces of moving mirror 40 by leaving formed a spacing on both sides of moving mirror 40 on the occasion of applying an anti-reflection coating on the face of moving mirror 40.

Figure 9:
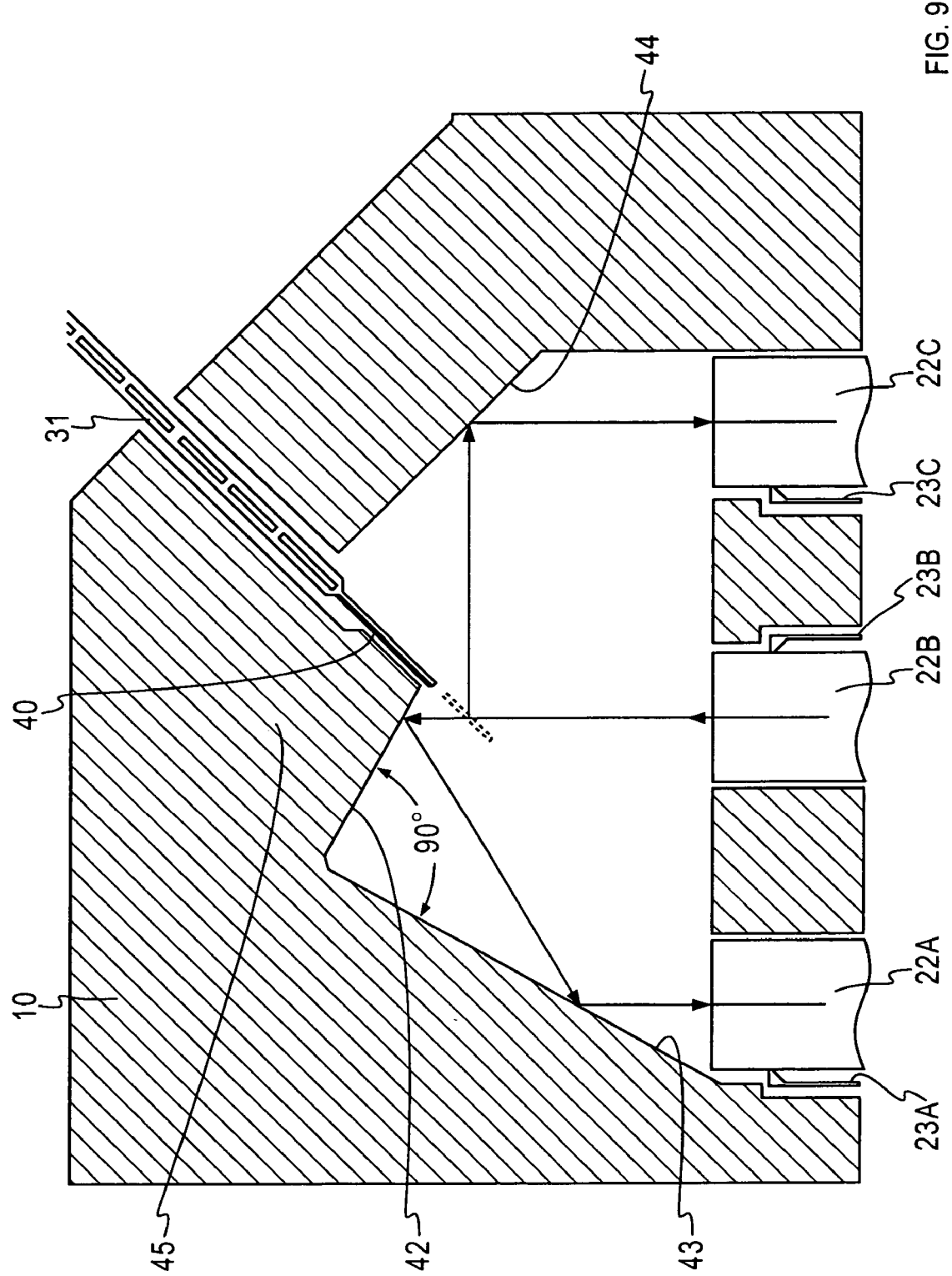
FIG. 9 is a plan view for explaining yet another variation of the variation shown in FIG. 8.

In FIG. 9, there is shown an embodiment in which a recess 45 is not formed. As shown in FIG. 9, the device can be operated as an optical switch without hindrance even in the case where a recess 45 is not present. However, in the case of the configuration of FIG. 9, in the manufacturing process thereof, there is the concern that, when cutting out moving mirror 40 and rod 31 from substrate 10 by micromachining technology and forming by application a reflective layer with an evaporation method on the face serving the reflective layer of moving mirror 40, the metal layer serving as a reflective layer ends up being applied only on the portion(s) of the side facing the spacing (i.e. the side facing fixed mirror 43,44) between reflective mirror 40 and rod 31, due to the fact that a recess 45 is not present.

In the example shown in FIG. 9, if a reflective layer is applied only on that face which shall serve as the primary reflective face of moving mirror 40, the object can be obtained, but if a reflective layer is formed thickly only on one face in this way, there arises a non-uniformity in the layer stress occurring on both sides of the moving mirror, so there arises the inconvenience that the mirror becomes curved.

As against this, by forming a recess 45 such as shown in FIG. 8 and opening up largely on both sides (the sides of the front and back faces) of moving mirror 40, it is possible to form uniformly, by application of a reflective layer, the front and back faces of moving mirror 40 and rod 31, so it is possible to provide an optical switch ensuring optical performance with high accuracy. Further, even in the embodiment shown in FIG. 2, the result of preventing the same curving for two moving mirrors, 40A and 40B, is obtained by providing an obliterated part 45 in the same spirit.

If, as the space opening up on both sides of a moving mirror, there is ensured, as a yardstick, a spacing of a distance on the order of one third or more of the height of the vertical side face (the mirror face) of the moving mirror as the opening from the same mirror face and in a direction in the plane of the substrate, the aforementioned objective is obtained.

The reflective layer is deposited by evaporation when the moving mirror is in the position of the first stable state described above, i.e. the natural state according to the etching mask. Here, in the embodiment of FIG. 2, as described above, the extracted state of each moving mirror is chosen as the first stable state, and in the embodiment of FIG. 7, the inserted state, in which positional accuracy is required for light reflection, is chosen as the first stable state.

What is claimed is:

1. An optical switch comprising,
a support part supporting end parts, mutually lined up in parallel on a substrate, of three optical waveguide parts;
a first and a second moving mirror capable of varying relative positions with respect to said substrate; and
a first and a second fixed mirror having fixed relative positions with respect to said substrate; wherein
the end part of the center optical waveguide part of the three optical waveguide parts supported by said support part is one input port;
the end parts of the two other optical waveguide parts, adjacent on both sides of said center optical waveguide part, are respectively a first output port and a second output port;
said first moving mirror and said second moving mirror are respectively capable of insertion into insertion positions, said insertion positions are on optical paths of emitted light from said input port to said first and second output ports, and distances on the optical paths from said input port to said insertion positions are the same;
it is capable of switching between a state in which only said first moving mirror is inserted into one of said insertion positions and a state in which only said second moving mirror is inserted into one of said insertion positions;
the emitted light from said input port is reflected, by said first moving mirror or said second moving mirror which are respectively inserted into one of said insertion positions, respectively to side of said first output port or to side of said second output port;
the light reflected by said first moving mirror to the side of said first output port is further reflected by said first fixed mirror and coupled to said first output port in parallel with, and in a reverse direction from, the emitted light from said input port;
the light reflected by said second moving mirror to the side of said second output port is further reflected by said second fixed mirror and coupled to said second output port in parallel with, and in a reverse direction from, the emitted light from said input port; and
the optical path from said first moving mirror to said first output port via said first fixed mirror and the optical path from said second moving mirror to said second output port via said second fixed mirror are symmetric with respect to an axis of the emitted light of said input port.

2. The optical switch according to claim 1, wherein
said first moving mirror and second moving mirror are respectively actuated by means of a first electrostatic actuator and a second electrostatic actuator, in a direction within a plane defined by the optical axis of the input port and an optical axis of one of the output ports, for insertion into and extraction from one of said insertion positions;
the insertion/extraction actuation directions of said first moving mirror and second moving mirror are inclined in respectively rectilinear directions with respect to the optical axis of said input port; and
the insertion/extraction actuation direction of said first moving mirror and the insertion/extraction actuation direction of said second moving mirror have a linear symmetry with respect to the optical axis of said input port.

3. The optical switch according to claim 2 comprising,
a first bistable hinge supporting said first moving mirror and having two stable states which are an inserted state that such said first moving mirror is inserted into one of said insertion positions and an extracted state such that said first moving mirror is extracted from the same position; and
a second bistable hinge supporting said second moving mirror and having two stable states which are an inserted state such that said second moving mirror is inserted into one of said insertion positions and an extracted state such that said second moving mirror is extracted from the same position; wherein
there is carried out actuation control of switching from a step in which one of said first moving mirror and said second moving mirror is in said inserted state and the other is in said extracted state, via a step in which both are at the same time in said extracted state, to a step in which the one is in said extracted stare and the other is in said inserted state; and, in each said extracted stare, part of said extracted first/second moving mirror remains within the assumable optical path in which the emitted light coming from said input port propagates in the case not blocked by said second/first moving mirror.

4. The optical switch according to claim 2 comprising, a first bistable hinge supporting said first moving mirror and having two stable states which are an inserted state such that said first moving mirror is inserted into one of said insertion positions and an extracted state such that said first moving mirror is extracted from the same position; and a second bistable hinge supporting said second moving mirror and having two stable states which are an inserted state such that said second moving mirror is inserted into one of said insertion positions and an extracted state such that said second moving mirror is extracted from the same position; wherein said first moving mirror and said second moving mirror are disposed leaving a neutral zone, being a spacing just large enough so that the two do not collide when an arbitrary one thereof is in said inserted state and the other is in said extracted state and an actuation to put the one which is in the inserted state into said extracted state and an actuation to put the other which is in the extracted state into said inserted state are simultaneously started and together executed;

and said actuation to put the one which is in the inserted state into said extracted state and said actuation to put the other which is in the extracted state into said inserted state are simultaneously started and together executed.

5. The optical switch according to claim 1, wherein said first moving mirror and second moving mirror ore formed as an integral component, a state of said first moving mirror being inserted into one of said insertion positions and a state of said second moving mirror being inserted into one of said insertion positions are switched by means of said integral component being actuated by one electrostatic actuator in a direction within a plane defined by the optical axis of the input port and an optical axis of one of the output ports.

6. An optical switch comprising, a support part supporting the end parts, mutually lined up in parallel on a substrate, of three optical waveguide parts;

a first and a second moving mirror capable of varying relative positions with respect to said substrate; and a first and a second fixed mirror having fixed relative positions with respect to said substrate; wherein the end part of the center optical waveguide part of the three optical waveguide parts supported by said support part is one input port;

the end parts of the two other optical waveguide parts, adjacent on both sides of said center optical waveguide part, are respectively a first output port and a second output port;

said first moving mirror and said second moving mirror are respectively capable of insertion into insertion positions, said insertion positions are on optical path of emitted light from said input port, and the distances on optical axis from said input port to each said insertion positions are the same;

it is capable of switching between a state in which only said first moving mirror is inserted into one of said insertion positions and a state in which only said second moving mirror is inserted into one of said insertion positions;

the emitted light from said input port is reflected, by said first moving mirror or said second moving mirror which are respectively inserted into one of said insertion positions, respectively to side of said first output port or to side of said second output port;

the light reflected by said first moving mirror to the side of said first output port is further reflected by said first fixed mirror and coupled to said first output port in parallel with, and in a reverse direction from, the emitted light from said input port;

the light reflected by said second moving mirror to the side of said second output port is further reflected by said second fixed mirror and coupled to said second output port in parallel with, and in a reverse direction from, the emitted light from said input port; and the end parts of said three optical waveguide parts are end parts of three single-mode optical waveguide parts;

the end part which is said input port and/or the end parts which are said two output ports have concentrating part(s);

light field emission patterns of each end face of said end parts of single-mode optical waveguide parts which are said two output ports are identical;

the optical path from said first moving mirror to said first output port via said first fixed mirror and the optical path from said second moving mirror to said second output port via said second fixed mirror are symmetric with respect to the axis of the emitted light of said input port.

7. The optical switch according to claim 6, wherein said first moving mirror and second moving mirror are respectively actuated by means of a first electrostatic actuator and a second electrostatic actuator, in a direction in within a plane defined by the optical axis of the input port and an optical axis of one of the output ports, for insertion into and extraction from one of said insertion positions;

the insertion/extraction actuation directions of said first moving mirror and second moving mirror are inclined in respectively rectilinear directions with respect to the optical axis of said input port; and the insertion/extraction actuation direction of said first moving mirror and die insertion/extraction actuation direction of said second moving mirror have a linear symmetry with respect to the optical axis of said input port.

8. The optical switch according to claim 7 comprising, a first bistable hinge supporting said first moving mirror and having two stable states which are an inserted state such that said first moving mirror is inserted into one of said insertion positions and an extracted state such that said first moving mirror is extracted from the same position; and a second bistable hinge supporting said second moving mirror and having two stable states which are an inserted state such that said second moving mirror is inserted into one of said insertion positions and an extracted state that said second moving mirror is extracted from the same position; wherein there is carried out actuation control of switching from a step in which one of said first moving mirror and said second moving mirror is in said inserted state and the other is in said extracted state, via a step in which bat are at the same time in said extracted state, to a step in which the one is in said extracted state and the other is in said inserted state; and, in each said extracted state, part of said extracted first/second moving mirror remains within the assumable optical path in which the emitted light coming from said input port propagates in the case not blocked by said second/first moving mirror.

9. The optical switch according to claim 7 comprising.

a first bistable hinge supporting said first moving mirror and having two stable states which are an inserted state such that said first moving mirror is inserted into one of said insertion positions and an extracted state such that said first moving mirror is extracted from the same position; and a second bistable hinge supporting said second moving mirror and having two stable states which are an inserted state such that said second moving mirror is inserted into one of said insertion positions and an extracted state that said second moving mirror is extracted from the same position; wherein the direction of movement of said first moving mirror and the direction of movement of said second moving mirror are coplanar, said first moving mirror and said second moving mirror are disposed leaving a neutral zone, being a spacing just large enough so that the two do not collide when an arbitrary one thereof is in said inserted state and the other is in said extracted state and an actuation to put the one which is in the inserted state into said extracted state and an actuation to put the other which is in the extracted state into said inserted state are simultaneously started and together executed;

and said actuation to put the one which is in the inserted state into said extracted state and said actuation to put the other which is in the extracted state into said inserted state are simultaneously started and together executed.

10. The optical switch according to claim 6, wherein said first moving mirror and second moving mirror are formed as an integral component, a state of said first moving mirror being inserted into one of said insertion position positions and a state of said second moving mirror being inserted into one of said insertion positions are switched by means of said integral component being actuated by one electrostatic actuator in a direction within a plane defined by the optical axis of the input port and an optical axis of one of the output ports.

11. The optical switch according to any one of claims 2, 3, 4, 7, 8 or 9, wherein said first moving mirror and said second moving mirror are constituted respectively by coating with reflective material the plate-shaped parts provided at the tips of rod-shaped components which are actuated for insertion in and extraction from said insertion positions;

there existing obliterated parts, on the rear portions of said first moving mirror and second moving mirror of said substrate, which open to face the two tracks on which the two said rod-shaped components are actuated for insertion in and extraction from said insertion positions; and due to said obliterated parts, in positions in which said first moving mirror and second moving mirror are each extracted from said insertion positions, respective both side of the front and back faces of the first moving mirror and the second moving mirror of said two rod-shaped components are left-open spaces.

12. A optical switch comprising:

a support part supporting end parts, mutually lined up in parallel on a substrate, of three optical waveguide parts;

a moving mirror capable of varying relative positions with respect to said substrate;

and a first, a second, and a third fixed mirror having fixed relative positions with respect to said substrate; wherein the end part of any one optical waveguide part of the three optical waveguide parts supported by said support part is one input port, and the end parts of the two remaining optical waveguide parts are respectively a first out port and a second output port;

said first fixed mirror reflecting light from said input port to a side of said first output port is placed in an optical path of the emitted light from said input port;

said moving mirror is constituted to be capable of being inserted into and extracted from a position on the optical path from said input port to said first fixed mirror, and said moving mirror reflects the light from said input port to a side of said second output port when said moving mirror is inserted into said position on the optical path;

the light reflected by said first fixed mirror is further reflected by said second fixed mirror, and the light reflected by said second fixed mirror is coupled to said first output port in parallel with and in a reverse direction from that of the emitted light from said input port;

the light reflected by said moving mirror is further reflected by said third fixed mirror, and the light reflected by said third fixed mirror is coupled to said second output port in parallel with and in a reverse direction from that of the emitted light from said input port;

a total distance from said input port, via said first fixed mirror and said second fixed mirror, to said first output port and a total optical distance from said input port, via said moving mirror and said third fixed mirror, to said second output port are equal;

the end parts of said three optical waveguide parts are supported by said support part as the positions of the three end faces thereof are lined up rectilinearly and optical axes of the end parts of the three optical waveguide parts coupled at the same end faces are mutually lined up in parallel, wherein the three optical waveguide parts constitute an inner optical waveguide part flanked by a first outer optical wave guide part and a second optical waveguide part;

the end part of the first outer optical waveguide part is said input port, and the second outer side optical waveguide part is said second output port;

the mirror faces of said first fixed mirror and said moving mirror are respectively inclined at a 45° angle, with respect to the axis of the emitted light from said input port, toward the side of said two output ports; and the mirror faces of said second fixed mirror and said third fixed mirror are respectively inclined at a 45° angle, with respect to the direction of the axis of said emitted light, toward said input port side.

13. The optical switch according to claim 12, wherein said moving mirror is actuated, by means of an electrostatic actuator, in a direction which is perpendicular to the axis of the emitted light from said input port and is within a plane defined by the optical axes of the end parts of the three optical waveguides.

14. The optical switch according to claim 12, wherein
the end parts of said three optical waveguide parts are end parts of three single-mode optical waveguide parts;
the end part which is said input port and/or the end ports which are said two output ports have concentrating part(s); and
light field emission patterns of each end race of said end parts of single-mode optical waveguide parts which are said two output ports are identical.

15. An optical switch comprising:
a support part supporting end parts, mutually lined up in parallel on a substrate, of three optical waveguide parts;
a moving mirror capable of varying relative positions with respect to said substrate;
and a first, a second, and a third fixed mirror having fixed relative positions with respect to said substrate; wherein
the end part of any one optical waveguide part of the three optical waveguide parts supported by said support part is one input port, and the end parts of the two remaining optical waveguide parts are respectively a first output port and a second output port;
said first fixed mirror reflecting light from said input port to a side of said first output port is placed in an optical path of the emitted light from said input port;
said moving mirror is constituted to he capable of being inserted into and extracted from a position on the optical path from said in put port to said first fixed mirror, and said moving mirror reflects the light from said input port to a side of said second output port when said moving mirror is inserted into said position on optical path;
the light reflected by said first fixed mirror is further reflected by said second fixed mirror, and the light reflected by said second fixed mirror is coupled to said first output port in parallel with and in a reverse direction from that of the emitted light from said input port;
the light reflected by said moving mirror is further reflected by said third fixed mirror, and the light reflected by said third fixed mirror is coupled to said second output port in parallel with and in a reverse direction from that of the emitted light from said input port;
a total optical distance from said input port, via said first fixed mirror and said second fixed mirror, to said first output port and a total optical distance from said input port, via said moving mirror and said third fixed mirror, to said second output port are equal;
the end parts of said three optical waveguide parts are supported by said support part as the positions of the three end faces thereof lined up rectilinearly and optical axes of the end parts of the three optical waveguide parts coupled at the same end faces are mutually lined up in parallel;
the end part of the center optical waveguide part thereof is said input port, the end parts of the two other optical waveguide parts, adjacent to both sides of said end part of the center optical waveguide part, are said first and second output ports; and
said moving mirror is inserted in the optical path from said input port to said first fixed mirror, from said second output port side with respect to the same optical path, in a direction within a plane defined by the optical axes of the input port and the first output port, and said moving mirror is extracted from the same optical path to the same second output port side, in a direction in the plane.

16. The optical switch according to claim 15, wherein
said moving mirror is constituted by coating with reflective material a plate-shaped part provided at the tip of a rod-shaped component which is actuated for insertion in and extraction from said optical path;
and said moving mirror is actuated for insertion and extraction on a truck facing the tear portion of said first fixed mirror,
there existing a recess, on the rear of said first fixed mirror of said substrate, which opens to face said truck on which said rod-shaped component is actuated for insertion and extraction, and
due to said recess, both sides of the front and back faces of said moving mirror are left-open spaces.

17. The optical switch according to claim 14, wherein
said moving mirror is actuated, by means of an electrostatic actuator, in a direction in the plane which is perpendicular to the axis of the emitted light from said input pod.

18. The optical switch according to claim 15, wherein
the end parts of said three optical waveguide parts are end parts of three single-mode optical waveguide parts;
the end part which is said input port and/or the end parts which are said two output ports have concentrating part(s); and
light field emission patterns of each end face of said end parts of single-mode optical waveguide parts which are said two output ports are identical.

19. The optical switch according to claim 18, wherein
said moving mirror is constituted by coating with reflective material a plate-shaped part provided at the tip of a rod-shaped component which is actuated for insertion in and extraction from said optical path;
and said moving mirror is actuated for insertion and extraction on a track facing the rear portion of said first fixed mirror,
there existing a recess, on the rear of said first fixed mirror of said substrate, which opens to face said track on which said rod-shaped component is actuated for insertion and extraction, and
due to said recess, both sides of the front and back faces of said moving mirror are left-open spaces.

20. The optical switch according to any one of claims 1, 6, 12, 14, 17 or 19, wherein
the end parts of said three optical waveguide parts are end parts of three optical fibers;
three grooves of rectangular cross section, mutually lined up in parallel, are formed in said substrate; and
fiber pressure-applying springs of hemilingual shape are provided at each one side of inner wall of said three grooves;
said end parts of three optical fibers are placed in said three grooves one by one, said fiber pressure-applying springs respectively push the sides said end parts of three optical fibers toward the facing inner walls of said three grooves, due to these pushing, said end parts of three optical fibers are respectively positioned on said facing inner walls;
the sides of inner wall at which said fiber pressure-applying springs are provided are mutually opposite between said grooves in which mutually optically coupled ports are respectively placed.

* * * * *